(12) United States Patent
Shen et al.

(10) Patent No.: US 8,069,400 B2
(45) Date of Patent: Nov. 29, 2011

(54) OPTIMAL CIRCULAR BUFFER RATE MATCHING FOR TURBO CODE

(75) Inventors: Ba-Zhong Shen, Irvine, CA (US); Tak K. Lee, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 847 days.

(21) Appl. No.: 12/132,971

(22) Filed: Jun. 4, 2008

(65) Prior Publication Data

US 2009/0049360 A1    Feb. 19, 2009

Related U.S. Application Data

(60) Provisional application No. 60/955,593, filed on Aug. 13, 2007.

(51) Int. Cl.
*H03M 13/03* (2006.01)

(52) U.S. Cl. .................. 714/790; 714/755

(58) Field of Classification Search .............. 714/790, 714/755
See application file for complete search history.

(56) References Cited

U.S. PATENT DOCUMENTS

| | | | |
|---|---|---|---|
| 5,406,570 A | 4/1995 | Berrou et al. | |
| 5,446,747 A | 8/1995 | Berrou | |
| 5,563,897 A | 10/1996 | Pyndiah et al. | |
| 6,065,147 A | 5/2000 | Pyndiah et al. | |
| 6,119,264 A | 9/2000 | Berrou et al. | |
| 6,122,763 A | 9/2000 | Pyndiah et al. | |
| 6,314,289 B1 * | 11/2001 | Eberlein et al. | 455/427 |
| 6,798,826 B1 * | 9/2004 | Shiu et al. | 375/147 |
| 2007/0189248 A1 * | 8/2007 | Chang et al. | 370/338 |
| 2008/0320353 A1 * | 12/2008 | Blankenship et al. | 714/746 |

FOREIGN PATENT DOCUMENTS

| | | |
|---|---|---|
| EP | 0 735 696 A2 | 10/1996 |
| EP | 0 735 696 A3 | 1/1999 |
| FR | 91 05278 A1 | 10/1992 |

OTHER PUBLICATIONS

3GPP TS 36.212 V2.0.0 (Sep. 2007), Technical Specification, "3rd Generation Partnership Project; Technical Specification Group Radio Access Network; Evolved Universal Terrestrial Radio Access (E-UTRA); Multiplexing and channel coding (Release 8)", (30 pages).
Ericsson, "Decoder Performance of CBRM Algorithms," 3GPP TSG-RAN WG1#49bis, Orlando, USA, Jun. 25-29, 2007, R1-073163 (5 pages).

* cited by examiner

*Primary Examiner* — Mujtaba K Chaudry
(74) *Attorney, Agent, or Firm* — Garlick Harrison & Markison; Shayne X. Short

(57) ABSTRACT

Optimal circular buffer rate matching for turbo code. An offset index, δ, of 3 and a skipping index, σ, of 3 is employed in accordance with circular buffer rate matching. This allows less puncturing of information bits and more puncturing of redundancy/parity bits (e.g., which can provide for a higher rate). Multiple turbo codes may be generated from a mother code such that each generated turbo code can be employed to encode information bits. For example, a first turbo coded signal can be generated using a first turbo code generated from the mother code, and a second turbo coded signal can be generated using a second turbo code generated from the mother code. Any of these turbo coded signal can be decoded using parallel decoding processing or a single turbo decoder (when each turbo coded signal undergoes processing to transform it back to the mother code format).

20 Claims, 19 Drawing Sheets

OPTIMAL CIRCULAR BUFFER RATE MATCHING FOR TURBO CODE

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 60/955,593, entitled "Optimal circular buffer rate matching for turbo code," filed Aug. 13, 2007, pending.

Incorporation by Reference

The following U.S. Utility Patent Application is hereby incorporated herein by reference in its entirety and is made part of the present U.S. Utility patent application for all purposes:

1. U.S. Utility patent application Ser. No. 12/020,016, entitled "Optimal period rate matching for turbo coding," filed Jan. 25, 2008, pending, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/927,264, entitled "Optimal period rate matching for turbo coding," filed May 2, 2007, now expired.

BACKGROUND OF THE INVENTION

1. Technical Field of the Invention

The invention relates generally to communication systems; and, more particularly, it relates to communication systems employing turbo coding.

2. Description of Related Art

Data communication systems have been under continual development for many years. One such type of communication system that has been of significant interest lately is a communication system that employs iterative error correction codes. Of those, one particular type of communication system that has received interest in recent years has been one which employs turbo codes (one type of iterative error correcting code). Communications systems with iterative codes are often able to achieve lower bit error rates (BER) than alternative codes for a given signal to noise ratio (SNR).

A continual and primary directive in this area of development has been to try continually to lower the SNR required to achieve a given BER within a communication system. The ideal goal has been to try to reach Shannon's limit in a communication channel. Shannon's limit may be viewed as being the data rate to be used in a communication channel, having a particular SNR, that achieves error free transmission through the communication channel. In other words, the Shannon limit is the theoretical bound for channel capacity for a given modulation and code rate.

The use of turbo codes providing such relatively lower error rates, while operating at relatively low data throughput rates, has largely been in the context of communication systems having a large degree of noise within the communication channel and where substantially error free communication is held at the highest premium. Some of the earliest application arenas for turbo coding were space related where accurate (i.e., ideally error free) communication is often deemed an essential design criterion. The direction of development then moved towards developing terrestrial-applicable and consumer-related applications. Still, based on the heritage of space related application, the focus of effort in the turbo coding environment then continued to be achieving relatively lower error floors, and not specifically towards reaching higher throughput.

More recently, focus in the art has been towards developing turbo coding, and variants thereof, that are operable to support higher amounts of throughput while still preserving the relatively low error floors offered within the turbo code context.

In fact, as the throughput requirement in communication systems increases, parallel turbo decoding, which employs a plurality of processors and a plurality of memory banks, become necessary. Many of the current systems support a wide range of codeword sizes. Thus, efficiency and flexibility in parallel turbo decoder design is of critical importance.

Generally speaking, within the context of communication systems that employ turbo codes, there is a first communication device at one end of a communication channel with encoder capability and second communication device at the other end of the communication channel with decoder capability. In many instances, one or both of these two communication devices includes encoder and decoder capability (e.g., within a bi-directional communication system).

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Many communication systems incorporate the use of a turbo code. While there are many potential applications that can employ turbo codes, means are presented herein that can be applied to the 3GPP channel code to support an arbitrary number of information bits. Some examples of the number of bits, though not limited thereto, that can be supported using the various aspects of the invention presented herein are 40 to 5114 for WCDMA and HSDPA and more for LTE. Alternatively, other examples of the number of bits, though not limited thereto, that can be supported using the various aspects of the invention presented herein are 40 to 6114 or 40 to 8192, or any other desirable number of bits as selected for a particular application.

Additional information regarding the UTRA-UTRAN Long Term Evolution (LTE) and 3GPP System Architecture Evolution (SAE) can be found at the following Internet web site:

www.3gpp.org

Turbo coding was suggested for 3GPP LTE channel coding. Within the channel coding system in 3GPP LTE, there is a need and desire to supply and provide for a wide range of block sizes (i.e., turbo code block lengths). For this coding system, the "quadratic polynomial permutation (QPP)" interleave has been selected.

Furthermore, the turbo decoding of this system generally needs to be implemented using a parallel decoding arrangement because of the very high data throughput and large block size desired for 3GPP LTE channel coding. The parallel decoding requires the collision-free memory accessing (i.e., any one turbo decoder (of a group of parallel arranged turbo decoders) accesses only memory (of a group of parallel arranged memories) at any given time).

Figure 1:
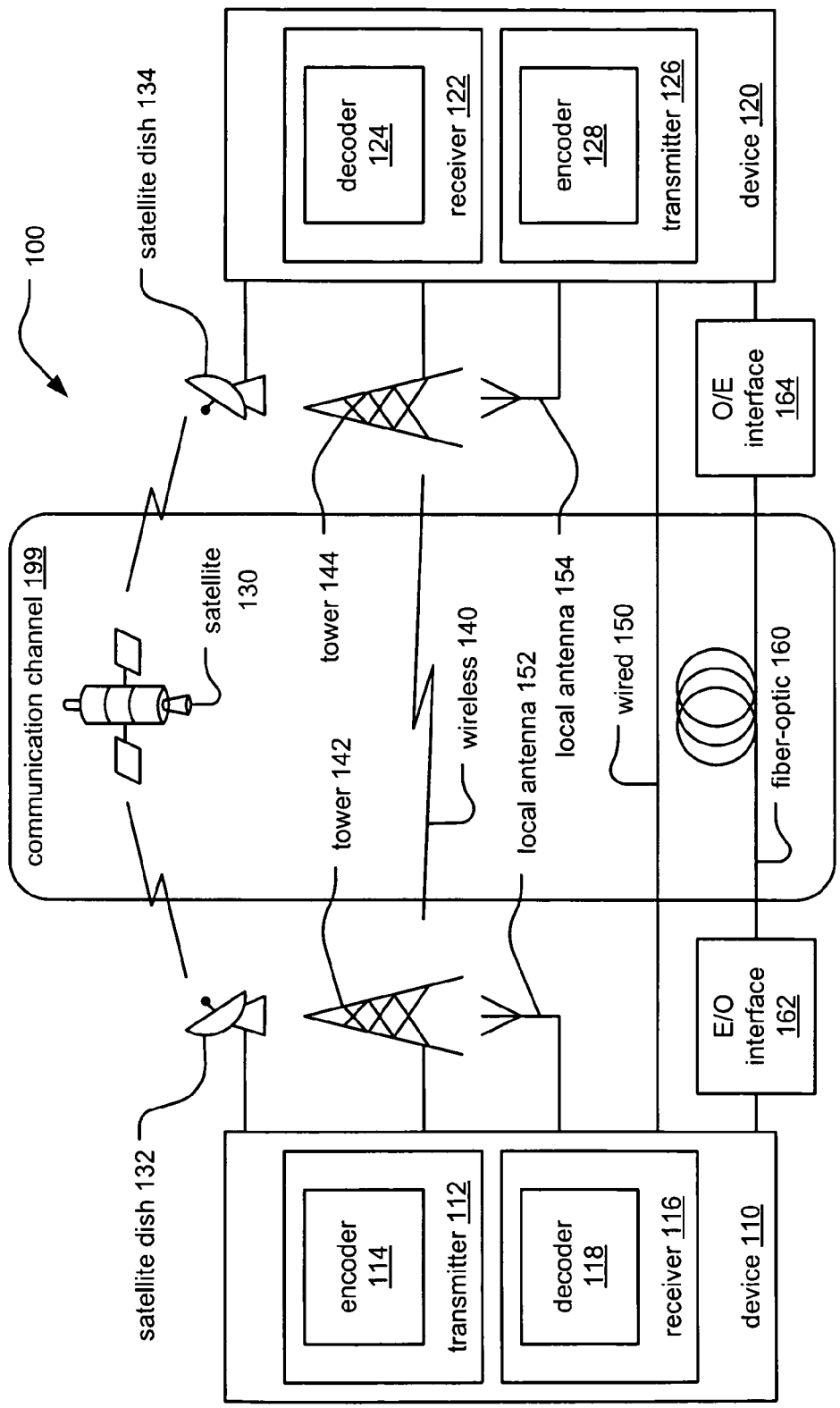
FIG. 1 and FIG. 2 illustrate various embodiments of communication systems.

The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
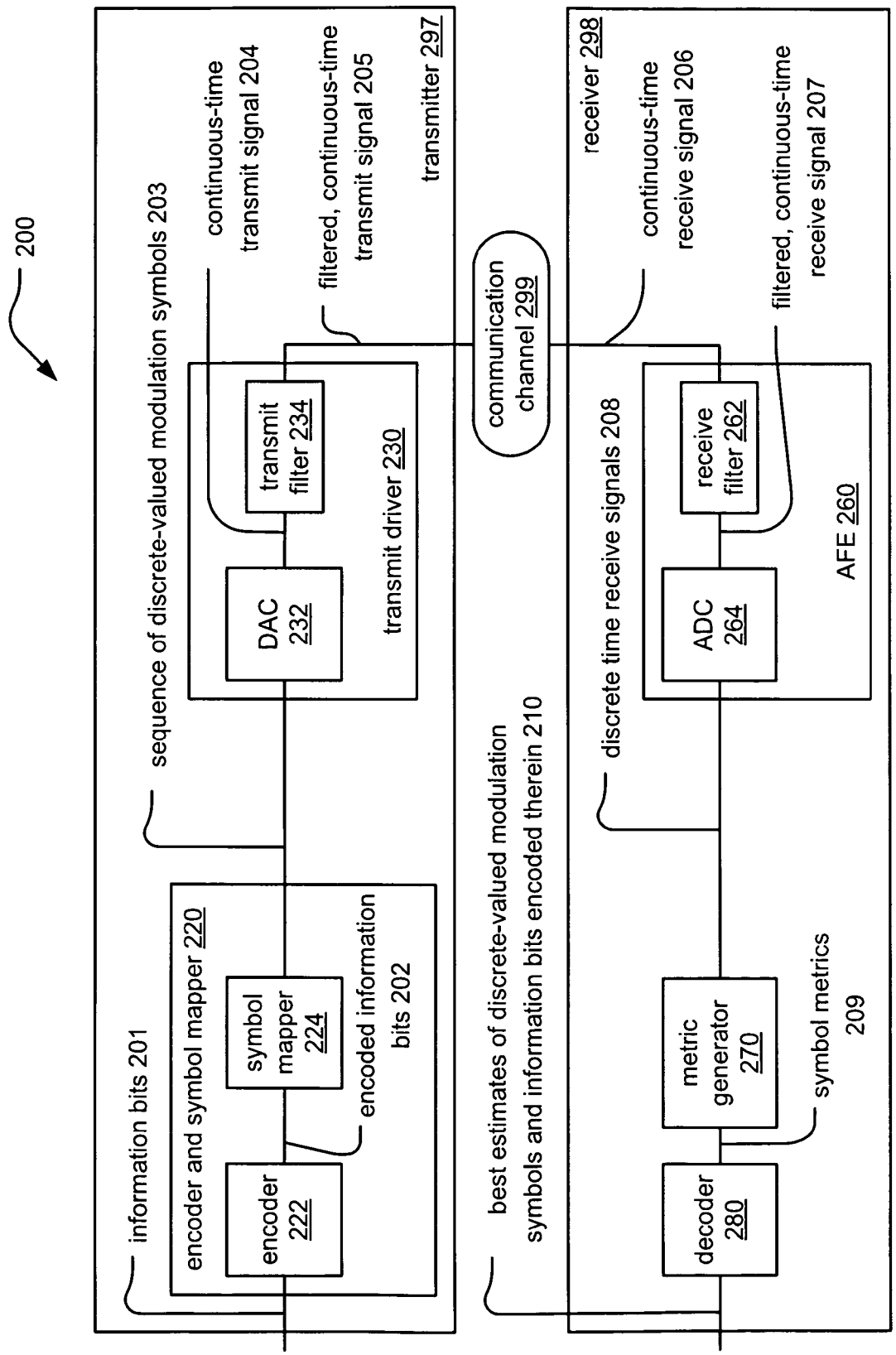

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter and a decoder at the receiver.

Referring to the communication system 200 of FIG. 2, at a transmitting end of a communication channel 299, information bits 201 are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates symbol metrics 209 that are employed by a decoder 280 to make best estimates of the discrete-valued modulation symbols and information bits encoded therein 210.

The decoders of either of the previous embodiments may be implemented to include various aspects and/or embodiment of the invention therein. In addition, several of the following Figures describe other and particular embodiments (some in more detail) that may be used to support the devices, systems, functionality and/or methods that may be implemented in accordance with certain aspects and/or embodiments of the invention. One particular type of signal that is processed according to certain aspects and/or embodiments of the invention is a turbo coded signal.

Figure 3:
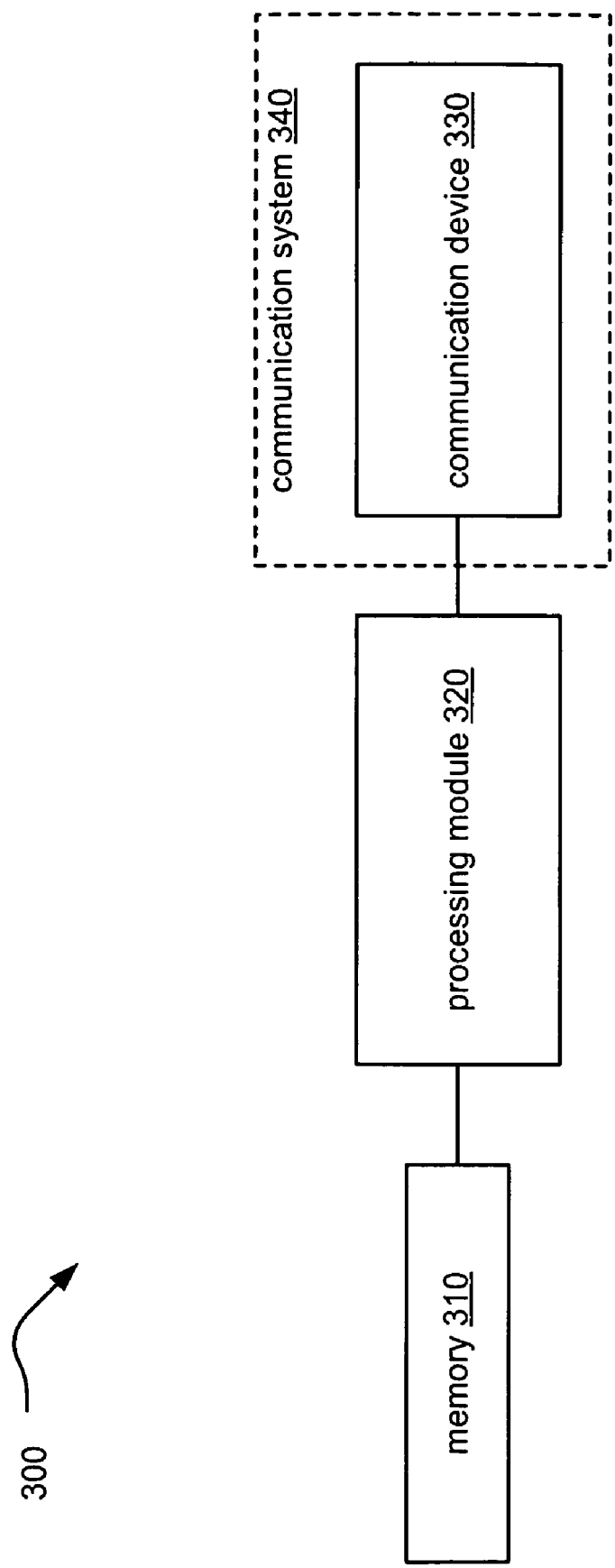
FIG. 3 illustrates an embodiment of an apparatus that is operable to perform turbo encoding and/or decoding processing.

FIG. 3 illustrates an embodiment of an apparatus 300 that is operable to perform turbo encoding and/or decoding processing. The apparatus 300 includes a processing module 320, and a memory 310. The memory 310 is coupled to the processing module, and the memory 310 is operable to store operational instructions that enable the processing module 320 to perform a variety of functions. The processing module 320 is operable to perform and/or direct the manner in which turbo encoding and/or decoding processing is to be performed in accordance with any embodiment described herein, or any equivalent thereof.

The processing module 320 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 310 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 320 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the manner in which the turbo encoding and/or decoding processing is to be performed can be provided from the apparatus 300 to a communication system 340 that is operable to employ and perform turbo encoding and/or decoding using a desired turbo code.

For example, information corresponding to the turbo code being used (e.g., the code rate, interleave, etc.) can also be provided from the processing module 320 to any of a variety of communication devices 330 implemented within the communication system 340 as well. In addition, the manner in which such turbo encoding and/or decoding is to be performed within any of a variety of communication devices 330 implemented within the communication system 340 can also be provided from the processing module 320.

If desired, the apparatus 320 can be designed to generate multiple means of performing turbo encoding and/or decoding in accordance with multiple needs and/or desires as well. In some embodiments, the processing module 320 can selectively provide different information (e.g., corresponding to different turbo codes, code rates, interleaves, block sizes, etc.) to different communication devices and/or communication systems. That way, different communication links between different communication devices can employ different turbo codes and/or means by which to perform turbo encoding and/or decoding. Clearly, the processing module 320 can also provide the same information to each of different communication devices and/or communication systems as well without departing from the scope and spirit of the invention.

Figure 4:
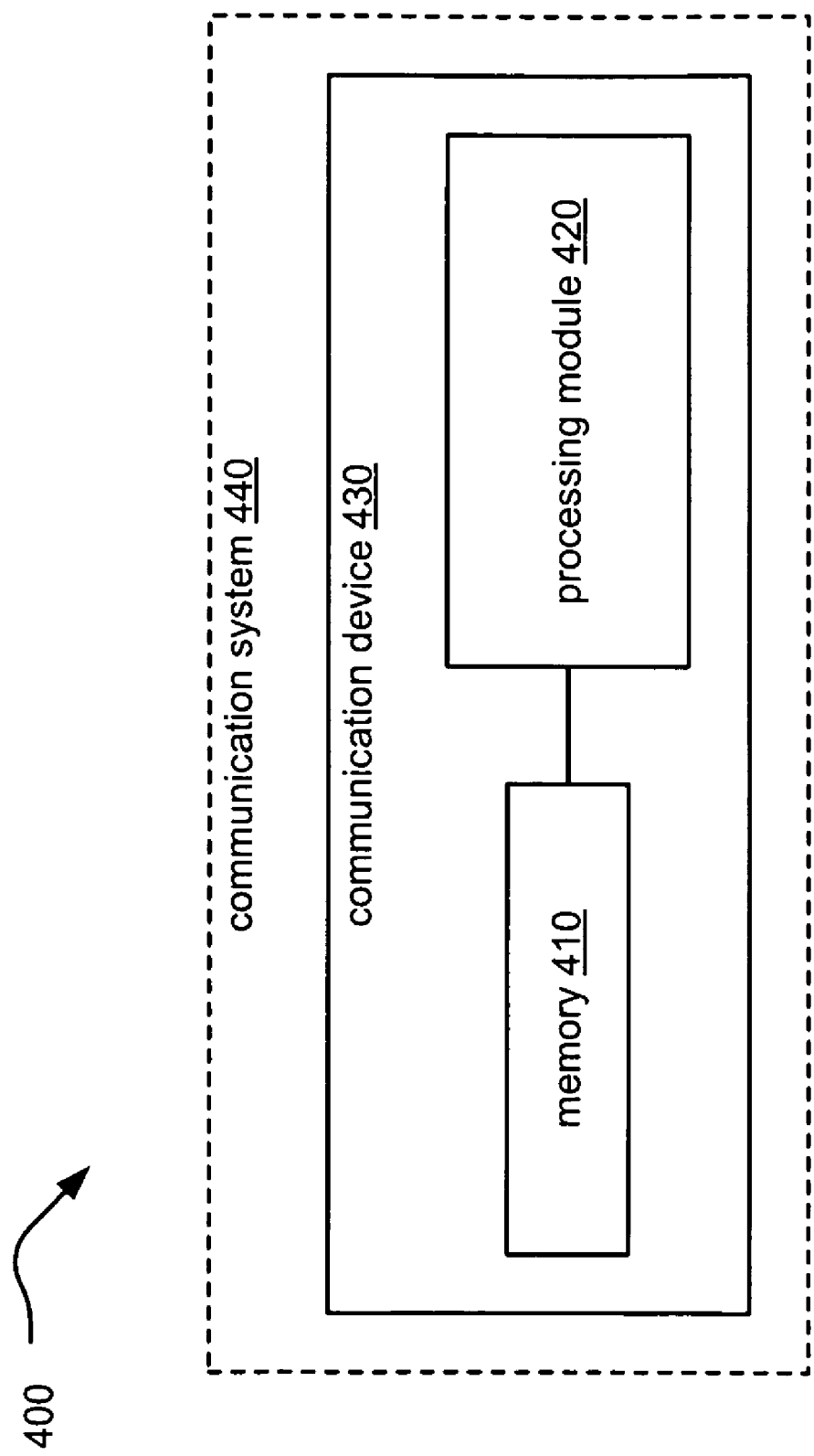
FIG. 4 illustrates an alternative embodiment of an apparatus that is operable to perform turbo encoding and/or decoding processing.

FIG. 4 illustrates an alternative embodiment of an apparatus 400 that is operable to perform turbo encoding and/or decoding processing. The apparatus 400 includes a processing module 420, and a memory 410. The memory 410 is coupled to the processing module, and the memory 410 is operable to store operational instructions that enable the processing module 420 to perform a variety of functions. The processing module 420 (serviced by the memory 420) can be implemented as an apparatus capable to perform any of the functionality of any of the various modules and/or functional blocks described herein. For example, the processing module 420 (serviced by the memory 420) can be implemented as an apparatus capable to perform and/or direct the manner in which turbo encoding and/or decoding processing is to be performed in accordance with any embodiment described herein, or any equivalent thereof.

The processing module 420 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 410 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 420 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

If desired in some embodiments, the apparatus 400 can be any of a variety of communication devices 430, or any part or portion of any such communication device 430. Any such communication device that includes the processing module 420 and/or memory 410 can be implemented within any of a variety of communication systems 440 as well. It is also noted that various embodiments of turbo encoding and/or decoding processing in accordance with those presented herein, and equivalents thereof, may be applied to many types of communication systems and/or communication devices.

Figure 5:
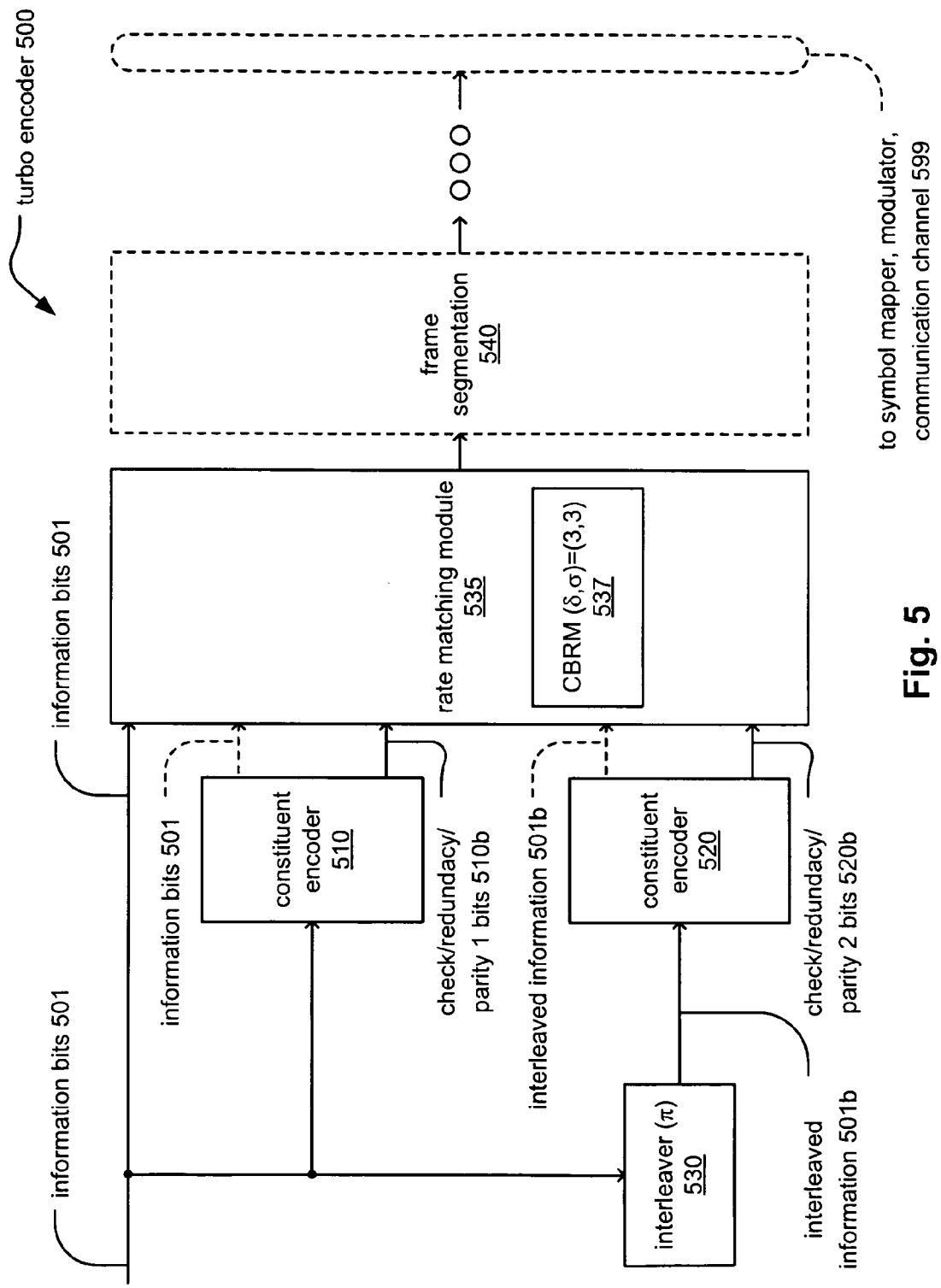
FIG. 5 and FIG. 6 illustrate various embodiments of turbo encoding modules.
Figure 6:
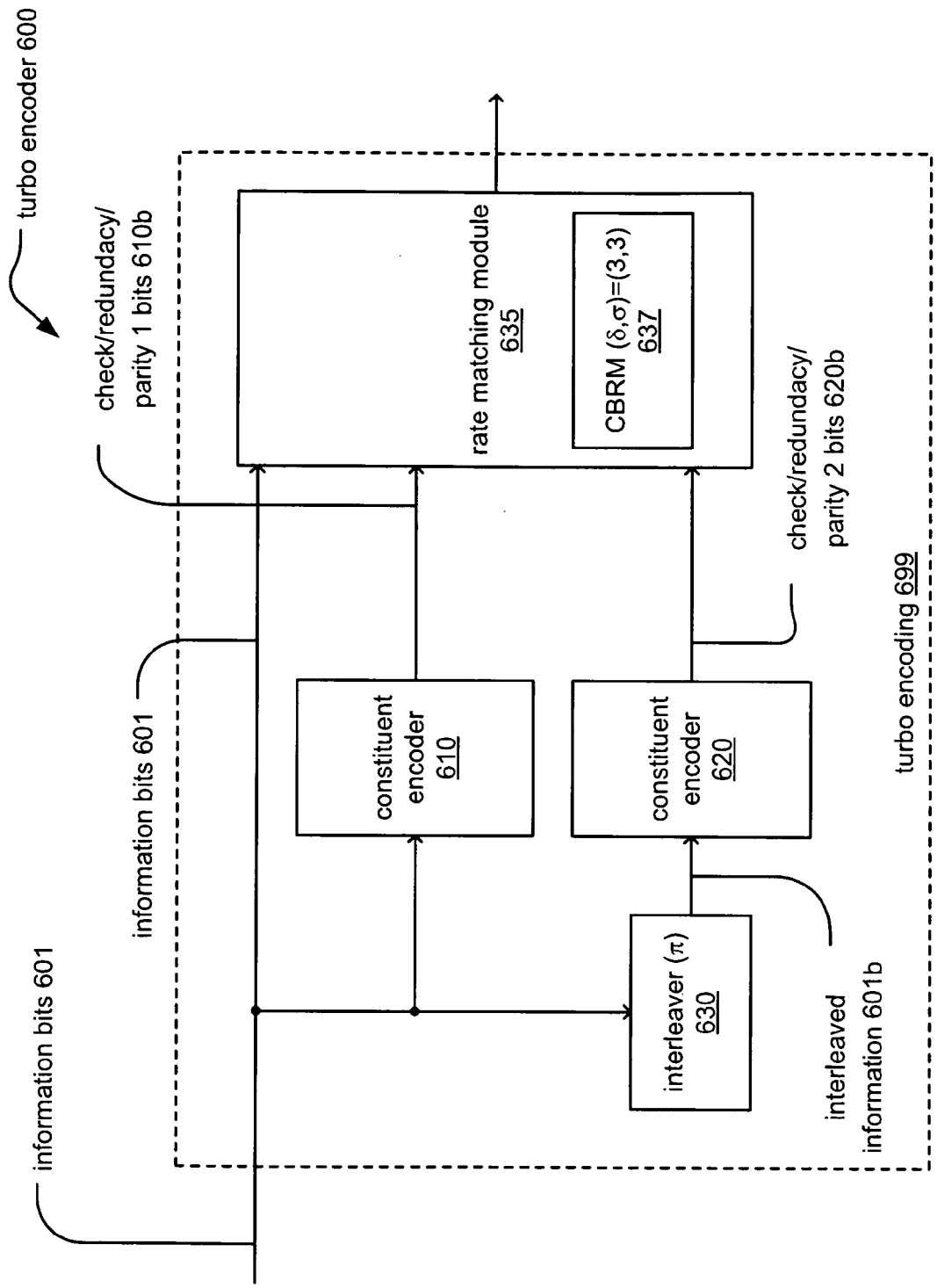

FIG. 5 and FIG. 6 illustrate various embodiments of turbo encoding modules 500 and 600, respectively.

FIG. 5 illustrates an embodiment of a turbo encoding module 500. Information bits are provided to an interleaver ($\pi$) module 530 that is operable to generate interleaved information 501b. The interleave ($\pi$) employed by the interleaver ($\pi$) module 530 can be a QPP interleave ($\pi$) in some embodiments. Alternatively, other desired interleaves ($\pi$) can be employed by the interleaver ($\pi$) module 530 without departing from the scope and spirit of the invention.

These information bits 501 are also passed to a first constituent encoder 510 from which both the information bits 501 as well as check/redundancy/parity 1 bits 510b are output there from.

The interleaved information 501b output from the interleaver ($\pi$) module 530 is also passed to a second constituent encoder 520 from which both the interleaved information 501b as well as check/redundancy/parity 2 bits 520b are output there from.

In the art, the parity bits output from a turbo encoder are sometimes referred to as check bits, parity bits, and/or redundancy bits. Moreover, the information bits output from a turbo encoder are sometimes referred to as the information bits (i.e., the very same as was provided to the turbo encoder) and also as systematic bits (e.g., in the context of a systematic encoder that, when encoding information bits, outputs those same information bits as well as check/redundancy/parity bits). Herein, parity bits and is oftentimes employed for reference to these check/redundancy/parity bits output from a turbo encoder, and information bits is oftentimes employed for reference to these information/systematic bits output from a turbo encoder.

Each of the information bits 501, the parity 1 bits 510b, and the parity 2 bits 520b is provided to a rate matching module 535 that is operable to perform appropriate rate matching. This can be performed using circular buffer rate matching (CBRM) that employs the parameters of skipping index, $\sigma$, and offset index, $\delta$, to be as follows: $(\sigma,\delta)=(3,3)$ (as also shown by reference numeral 537). Thereafter, the rate matched signal can be provided to a frame segmentation module 540. Various other components can also be situated as part of or after the frame segmentation module 540 to assist in the generation of an encoded block that may then be passed to a symbol mapper where the symbols are mapped according to the appropriate modulation (constellation and mapping). These symbol mapped symbols may then undergo any appropriate modulation as required to generate a continuous-time signal whose format comports with a communication channel into which the turbo coded signal is to be launched.

FIG. 6 illustrates an embodiment of a turbo encoding module 600. Information bits are provided to an interleaver ($\pi$) module 630 that is operable to generate interleaved information 601b. The interleave ($\pi$) employed by the interleaver ($\pi$) module 630 can be a QPP interleave ($\pi$) in some embodiments. Alternatively, other desired interleaves ($\pi$) can be employed by the interleaver ($\pi$) module 630 without departing from the scope and spirit of the invention.

These information bits 601 are also passed to a first constituent encoder 610 from which both the information bits 601 as well as check/redundancy/parity 1 bits 610b are output there from.

The interleaved information 601b output from the interleaver ($\pi$) module 630 is also passed to a second constituent encoder 620 from which both the interleaved information 601b as well as check/redundancy/parity 2 bits 620b are output there from.

Each of the information bits 601, the check/redundancy/parity 1 bits 620a, and the check/redundancy/parity 2 bits 620b is provided to a rate matching module 635 that is operable to perform appropriate rate matching. This can be performed using circular buffer rate matching (CBRM) that employed the parameters of skipping index, σ, and offset index, δ, to be as follows: (σ,δ)=(3,3) (as also shown by reference numeral 637). Thereafter, the rate matched signal can also be provided to a frame segmentation module (e.g., as within the previous embodiment) and then to other components. Alternatively, the rate matched signal can also be provided directly to components to perform symbol mapping, modulation, etc. Also, various other components can also be situated after the rate matching module 635 to assist in the generation of an encoded block that may then be passed to a symbol mapper where the symbols are mapped according to the appropriate modulation (constellation and mapping). These symbol mapped symbols may then undergo any appropriate modulation as required to generate a continuous-time signal whose format comports with a communication channel into which the turbo coded signal is to be launched.

Figure 7:
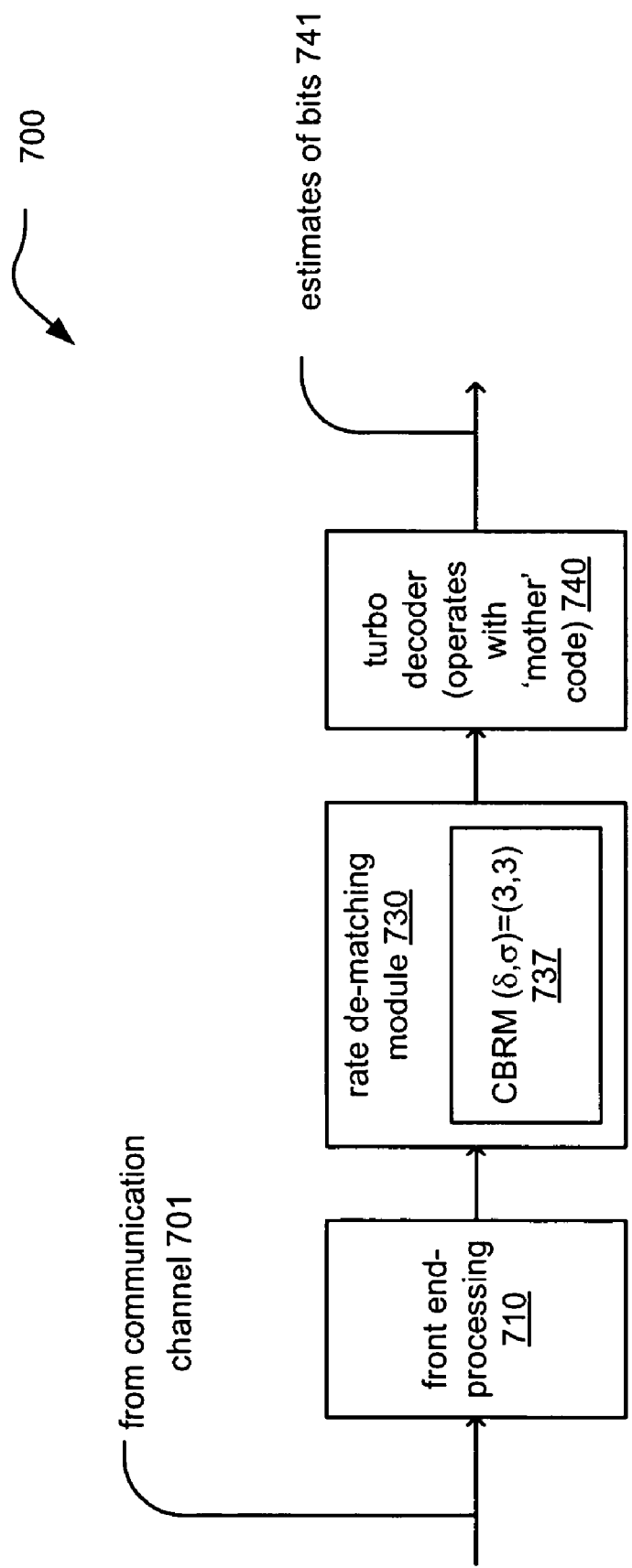
FIG. 7 and FIG. 8 illustrate various embodiments of turbo decoding modules.
Figure 8:
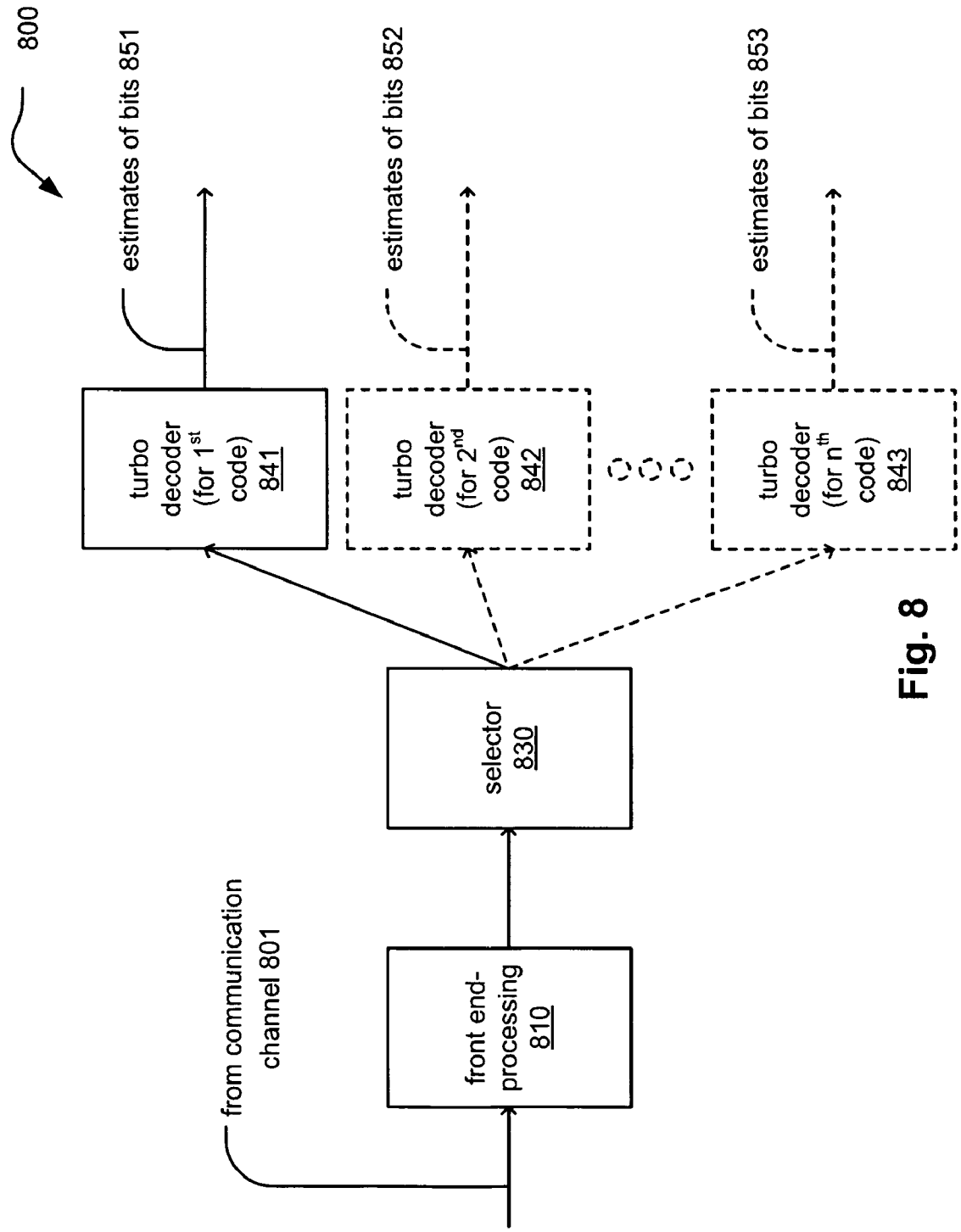

FIG. 7 and FIG. 8 illustrate various embodiments of turbo decoding modules 700 and 800, respectively.

Referring to FIG. 7, a signal 701 is received from a communication channel and is then provided to a front-end processing module 710. This front-end processing module 710 is operable to perform all appropriate initial processing (e.g., analog filtering, gain adjustment, digital sampling, and/or digital filtering, etc.) to generate a baseband signal that is then provided to a rate de-matching module 730 that is operable to employ to perform rate de-matching in accordance with circular buffer rate matching (CBRM) that employs the parameters of skipping index, σ, and offset index, δ, to be as follows: (σ,δ)=(3,3) (as also shown by reference numeral 737). This then transforms the signal back to the format of the 'mother code', so that a singularly implemented turbo decoder can operate all signals received via the communication channel. For example, regardless of which type of rate matching is performed (e.g., regardless of which code rate employed, etc.), then the rate de-matching module 730 that is operable to transform the received signal back to a format by which a turbo decoder employing the 'mother code' can then decode it. Estimates of at least one information bit encoded into the signal is then output from the turbo decoder 740, as shown by reference numeral 741.

Referring to FIG. 8, a signal 801 is received from a communication channel and is then provided to a front-end processing module 810. As within other embodiments, this front-end processing module 810 is operable to perform all appropriate initial processing (e.g., analog filtering, gain adjustment, digital sampling, and/or digital filtering, etc.) to generate a baseband signal that is then provided to a selector module 830 that is operable to provide the received signal to an appropriate turbo decoder (selected form among a plurality of turbo decoder 841-843). Each of the turbo decoders 841-843 is operable to perform decoding of a particular turbo coded signal that has been generated. For example, turbo decoder 841 is operable to decode a signal generated using a $1^{st}$ code, turbo decoder 842 is operable to decode a signal generated using a $2^{nd}$ code, . . . , and turbo decoder 843 is operable to decode a signal generated using an $n^{th}$ code. Each of the plurality of turbo decoder 841-843 is then operable to output an estimate of at least one information bit encoded within the signal being decoded (e.g., as shown using reference numerals 851-853, respectively).

By provisioning multiple turbo decoders, the need for a rate de-matching module is obviated in this embodiment, as each distinct turbo decoder is then implemented and capable to perform decoding of a turbo coded signal having its particular parameters.

In certain turbo decoding embodiments, a decoder can be implemented to include a plurality of turbo decoders that is operable to perform parallel decoding processing of a turbo coded signal transmitted from another communication device. In certain other embodiments as well, when such communication devices are bi-directional capable (e.g., including both an encoder and a decoder), then the decoder can be implemented to include a plurality of turbo decoders that is operable to perform parallel decoding processing of a turbo coded signal transmitted from another communication device.

More details of circular buffer rate matching (CBRM) is provided below.

The circular buffer rate matching (CBRM) was adopted as channel rate matching 3GPP LTE (e.g., see reference [1]). In CBRM, three sub-block interleaves are applied to interleave systematic bit stream, parity 1 stream (parity bits from top constituent encoder) and parity 2 stream (from bottom constituent encoder). The interleaves are rectangular interleaves with 32 columns with column permutation (e.g., see reference [1]).

Let $s_0, s_1, \ldots, s_{L_0-1}, s_{L_0}, \ldots s_{K-1}$ be the systematic (information) bit stream (where the last 4 bits come from termination bits) from turbo encoder with first $L_0$ padded 0 bits. Let $p_0^1, p_1^1, \ldots, p_{L_0-1}^1, p_{L_0}^1, \ldots, p_{K-1}^1$ be the parity 1 bit stream from top constituent encoder with the first $L_0$ 0 parity bits from padded 0 bits sent to encoder. Let $p_0^2, p_1^2, \ldots, \ldots, p_{K-1}^2$ be the parity 2 bit stream from bottom constituent encoder, where the parity bits corresponded the padded bits a) may not be 0 and b) may not be at beginning.

Consider sub-block interleaves for CBRM. Since they are rectangular interleave with 32 columns, the number of rows R should be the smallest integer such that $K \leq 32\,R$. Let $S = 32\,R$ and $N_D = S - K$. Then we have $N_D < 32$. These $N_D$ dummy bits shall be padded to three streams. Let used denote the padded new streams be $t_0, t_1, \ldots, t_{S-1} = d_0 \ldots d_{N_D-1} s_0, s_1, \ldots, s_{K-1}$ $q_0^1, q_1^1, q_{S-1}^1 = d_0 \ldots d_{N_D-1} p_0^1, p_1^1, \ldots, p_{K-1}^1$ $q_0^2, q_1^2, \ldots q_{S-1}^2 = d_0 \ldots d_{N_D-1} p_0^2, p_1^2, p_{K-1}^2$ From the zero padding of turbo encoding, we know that $t_{N_D}, \ldots, t_{N_D+L_0-1}$ and $q_{N_D}^1, \ldots, q_{N_D+L_0-1}^1$ are zero padded bits from turbo encoding, respectively. These streams will respectively write into the rectangular matrix row by row with 32 elements in a row. Then the 32 column shall be permuted using the following permutation table (e.g., see reference [1]).

| Number of columns C | Inter-column permutation pattern <P(0), P(1), . . . , P(C − 1)> |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

After the columns permutation, the stream will be read out column by column.

Let π be such an interleave, then we can write $$\pi(i) = P\left(\left\lfloor \frac{i}{R} \right\rfloor\right) + 32 * (i \bmod R)$$

This interleave is used for systematic stream as well as the parity 1 stream. For the parity 2 stream the interleave λ is constructed with the offset index, δ, where δ≧0, such that
λ(i)=(π(i)+δ)mod S With the skipping index σ and RV (redundancy version) index, rv, the first output bits of CBRM should be the number I(σ,rv)=R(24·rv+σ) bit.

As can be seen, the parameters offset index, δ, and skipping index, σ, are two of the parameters that are employed to govern the CBRM.

In 5.1.4.1.2 and 5.1.4.1.3 of TS36.212 (e.g., see reference [1]), a pair of parameters for circular buffer rate matching, namely, the skip index, σ, for starting point for systematic bits and offset index, δ, for the sub-block interleave of the second parity bits are given to be (2, 1). With this parameters and 6 iterations turbo decoding, there are many bad performed blocks, some of them can cause as larger as 0.4 dB spikes, see FIG. 9 as described below and also reference [2].

FIGS. 9, 10, 11, 12, 13, 14, and 15 illustrate various embodiments of performance diagrams 900, 1000, 1100, 1200, 1300, 1400, and 1500, respectively. Oftentimes performance diagrams are described in the context of BLER (Block Error Rate) [or BER (Bit Error Rate)] versus $E_b/N_o$ (ratio of energy per bit $E_b$ to the Spectral Noise Density $N_o$). This term $E_b/N_o$ is the measure of SNR (Signal to Noise Ratio) for a digital communication system. When looking at such performance curves, the BLER [or BER] may be determined for any given $E_b/N_o$ (or SNR) thereby providing a relatively concise representation of the performance of the decoding approach.

Other times, performance diagrams are described in the context of $E_b/N_o$ (ratio of energy per bit $E_b$ to the Spectral Noise Density $N_o$) versus interleaver size (e.g., interleaver (π) block size/information block size of the turbo coded signal).

This is the manner in which many of the performance diagrams are described herein.

In reference [2], it is suggested to replace these parameters of skip index, σ, and offset index, δ, to (σ, δ)=(4, 4). Indeed, changing them reduces the spike tremendously. However, as indicated also in reference [2], with (σ, δ)=(4, 4) the overall performances with 6 iterations is also reduced.

Figure 9:
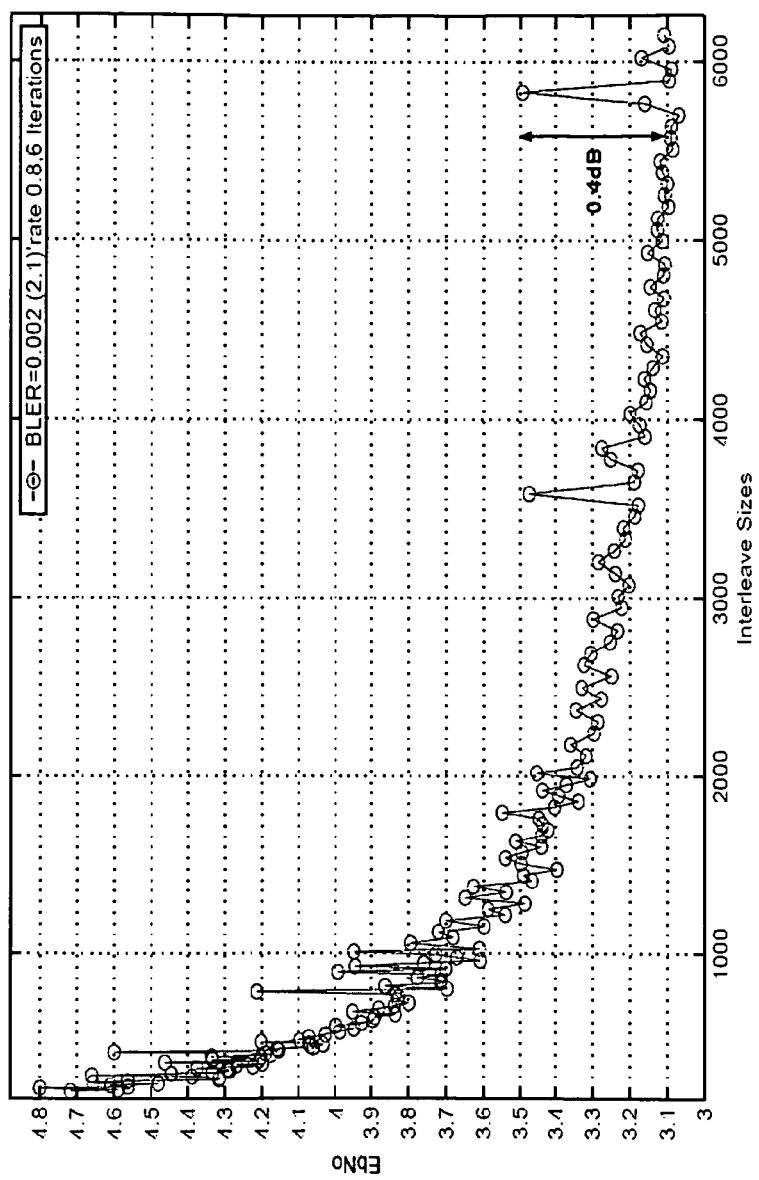
FIGS. 9, 10, 11, 12, 13, 14, and 15 illustrate various embodiments of performance diagrams.
Figure 10:
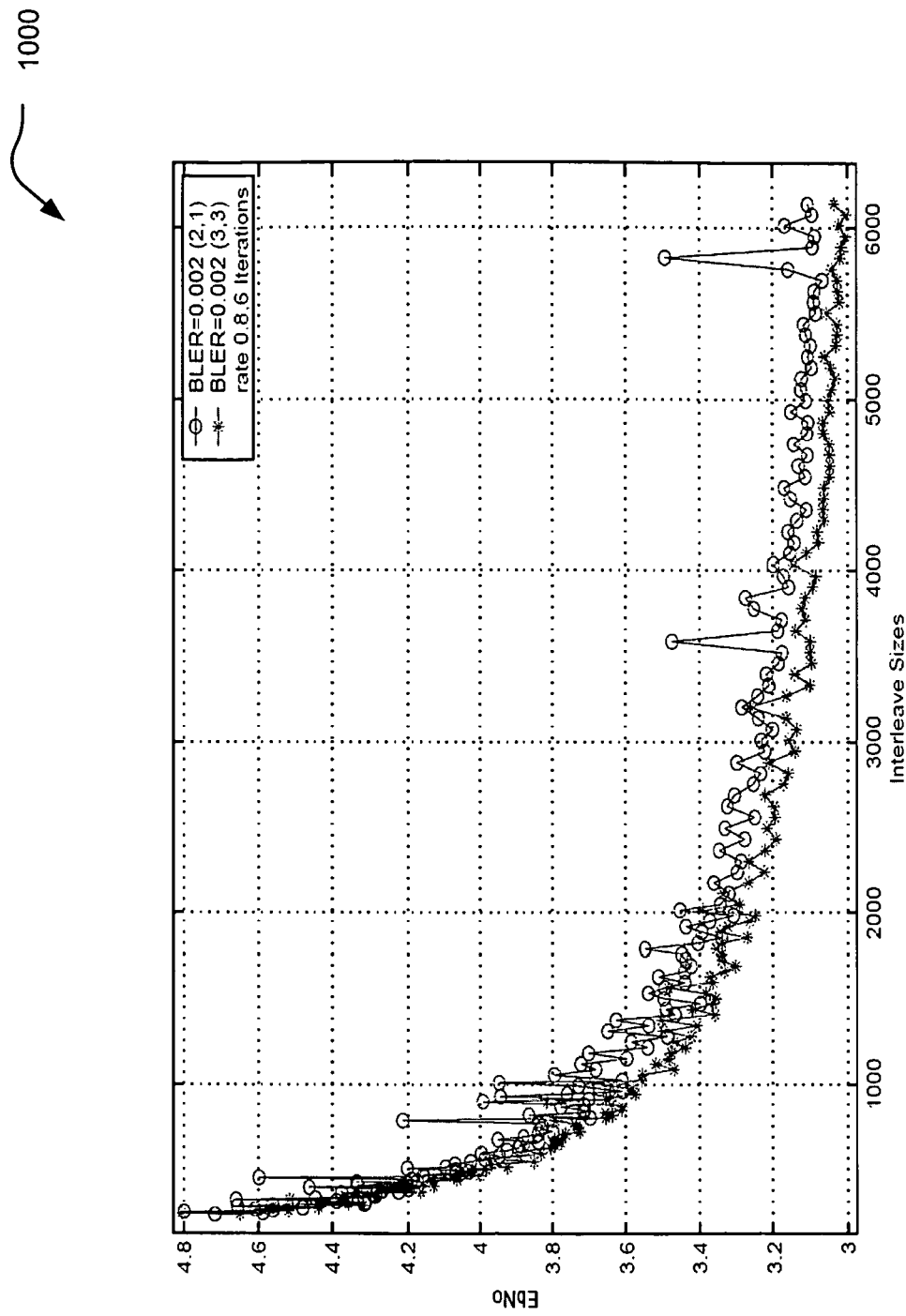

With puncturing patterns analysis and thoroughly simulations, an unexpected result was found, in that, a certain combination of these parameters of skip index, σ, and offset index, δ, to be (σ, δ)=(3, 3) actually provided for comparable and/or better performance while also not generating these undesirable spikes. This result is that an optimal set of these parameters of skip index, σ, and offset index, δ, is (σ, δ)=(3, 3). With these optimal parameters and 6 iterations of turbo decoding, all of the spikes in FIG. 9 are gone (see FIG. 10), moreover the over all performance is also improved (e.g., also see FIG. 10).

By employing appropriate parameters of skip index, σ, and offset index, δ, to be (σ, δ)=(3, 3), multiple simulations on different BLER as well as on different code rates are shown herein to perform the reducing of spikes and also general improvement of the overall performance of the code.

Many of these diagrams show the use of appropriate parameters of skip index, σ, and offset index, δ, to be (σ, δ)=(3, 3) as opposed to (σ, δ)=(2, 1).

As described in the commonly-assigned patent application that has been incorporated herein by reference above [U.S. Provisional Application Ser. No. 60/927,264, entitled "Optimal period rate matching for turbo coding," filed May 2, 2007, pending], the CBRM offers periodic puncturing patterns. Furthermore, therein the inventors also suggest using sub-optimal periodic puncturing patterns that related to the mother encoder.

In reference [2], based on avoiding catastrophic puncturing patterns a different offset index and skip index were suggested. Unfortunately, those modified parameters of reference [2] only work well for turbo decoder with 8 iterations (i.e., using only 6 iterations to perform turbo decoding provide much worse performance).

Consider puncturing patterns for rate 0.8 codes. When the skip index, σ, is 2 (defined in TS 36.212), the puncturing pattern of systematic bits is as follows:
1111011111111111
which has period 16. Moreover, only one bit is punctured within in the period. When the skip index is 4[2], the corresponded puncturing pattern is as follows:
11110111
which has period 8. Moreover, only one bit is punctured within the period. Although periodic is enough as pointed out in U.S. Provisional Application Ser. No. 60/927,264, the puncture pattern given by CBRM is not optimally selected. Therefore, this period is too short for 6 iteration decoding.

When skip index, σ, is 3 as we propose, the corresponded puncturing pattern is as follows:
11110111111101111111011111111111
which has period 32. Different to the previous patterns 3 bits are punctured within the period, i.e. approximately, there is a systematic bit being punctured in every 10 consecutive bits.

Now consider the puncturing pattern for parity 1 bits of the turbo encoder. With the parameter given in TS 36.212, the puncturing pattern is as follows:
00001000100010000000100000001000
which has period 32. 5 bits are not punctured in the period; i.e. approximately, there is one un-punctured bit in every 6 consecutive bits. If the parameter is taken to be (4, 4) in reference [2] or to be (3,3) as we proposed, the puncturing pattern is
0000100010001000
which has period 16. 3 bits are not punctured in the period; i.e. approximately, there is one un-punctured bit in every 5 consecutive bits. Comparing to pattern with parameter (2, 1), less parity 1 bits are punctured.

Consider the puncturing patterns for parity bits 2. With the parameter given in TS 36.212, the puncturing pattern is
00000100010001000000010000000100
which has period 32. 5 bits are not punctured in the period; i.e. approximately, there is one un-punctured bit in every 6 consecutive bits. If the parameter is taken to be (4, 4) in reference [2], the puncturing pattern is
1000000010001000 (*)
which has period 16. 3 bits are not punctured in the period; approximately, there is one unpunctured bit in every 5 consecutive bits. If the parameter is taken to be (3, 3) as we suggested, the puncturing pattern is
0000000100010001 (**)
The difference between (*) and (**) is the starting position and therefore the total number of punctured bits will be different.

In the following, we show the performance comparison for code rate 0.8, 0.7, 0.6, 0.5 and 0.4

The simulation parameters of the following 5 performance comparisons are as shown in the following Table:

| Simulation Parameters | |
|---|---|
| Common code structure | Turbo code in TS 36.212 |
| Circular buffer rate matching parameters | 1) $(\sigma, \delta) = (2, 1)$ (TS 36.212)<br>2) $(\sigma, \delta) = (3, 3)$ |
| First transmission code rate | $r = 0.5, 0.6, 0.7, 0.8$ |
| Tested block lengths | For all QPP interleave size K $\geq 288 \times r$ |
| Redundancy version (RV) | 0 |
| Number of maximal iterations | 6 |
| Modulation | QPSK |
| Channel | AWGN |

Figure 11:
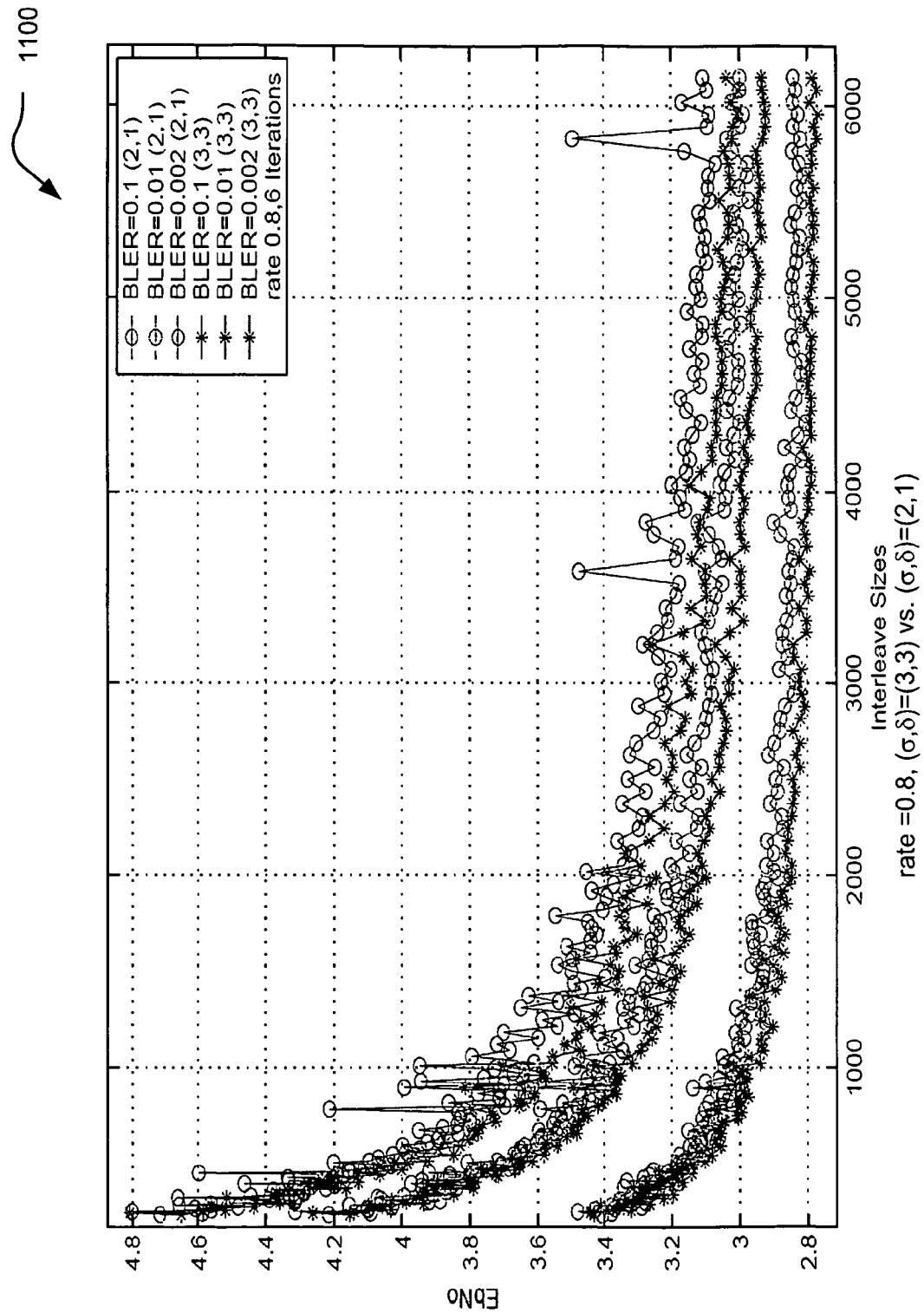
Figure 12:
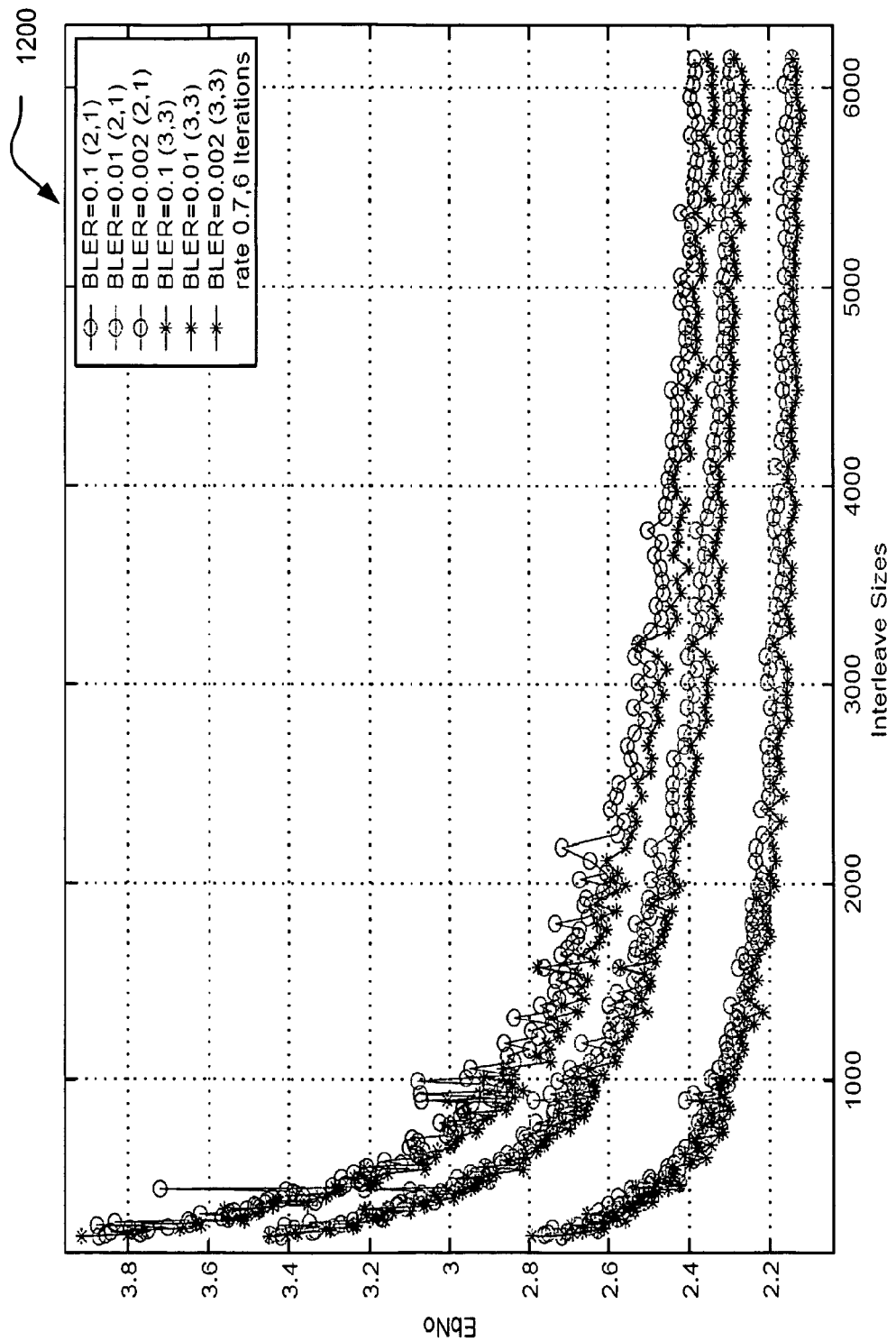

Referring to embodiment 1100 of FIG. 11, obviously, all the spikes given by the selection of parameters $(\sigma,\delta)=(2,1)$ are gone. Moreover, the overall performances of the various codes are also improved.

In detail, among 164 interleave sizes, when BLER=0.1 there are 150 blocks in accordance with the parameters $(\sigma,\delta)=(3,3)$ that are better than when using the parameters $(\sigma,\delta)=(2,1)$, i.e. 91.5% are better; when BLER=0.01 there are 155 blocks (3,3) is better than (2,1), i.e. 94.5% are better; when BLER=0.002 there are 154 blocks (3,3) is better than (2,1), i.e. 93.9% are better.

Referring to embodiment 1200 of FIG. 12, once again, all the spikes given by the selection of parameters $(\sigma,\delta)=(2,1)$ are gone and the overall performances of the various codes are improved.

In detail, among 167 interleave sizes, when BLER=0.1 there are 149 blocks in accordance with the parameters $(\sigma,\delta)=(3,3)$ that are better than when using the parameters $(\sigma,\delta)=(2,1)$, i.e. 89.2% are better; when BLER=0.01 there are 157 blocks (3,3) is better than (2,1), i.e. 94% are better; when BLER=0.002 there are 156 blocks (3,3) is better than (2,1), i.e. 93.4% are better.

Figure 13:
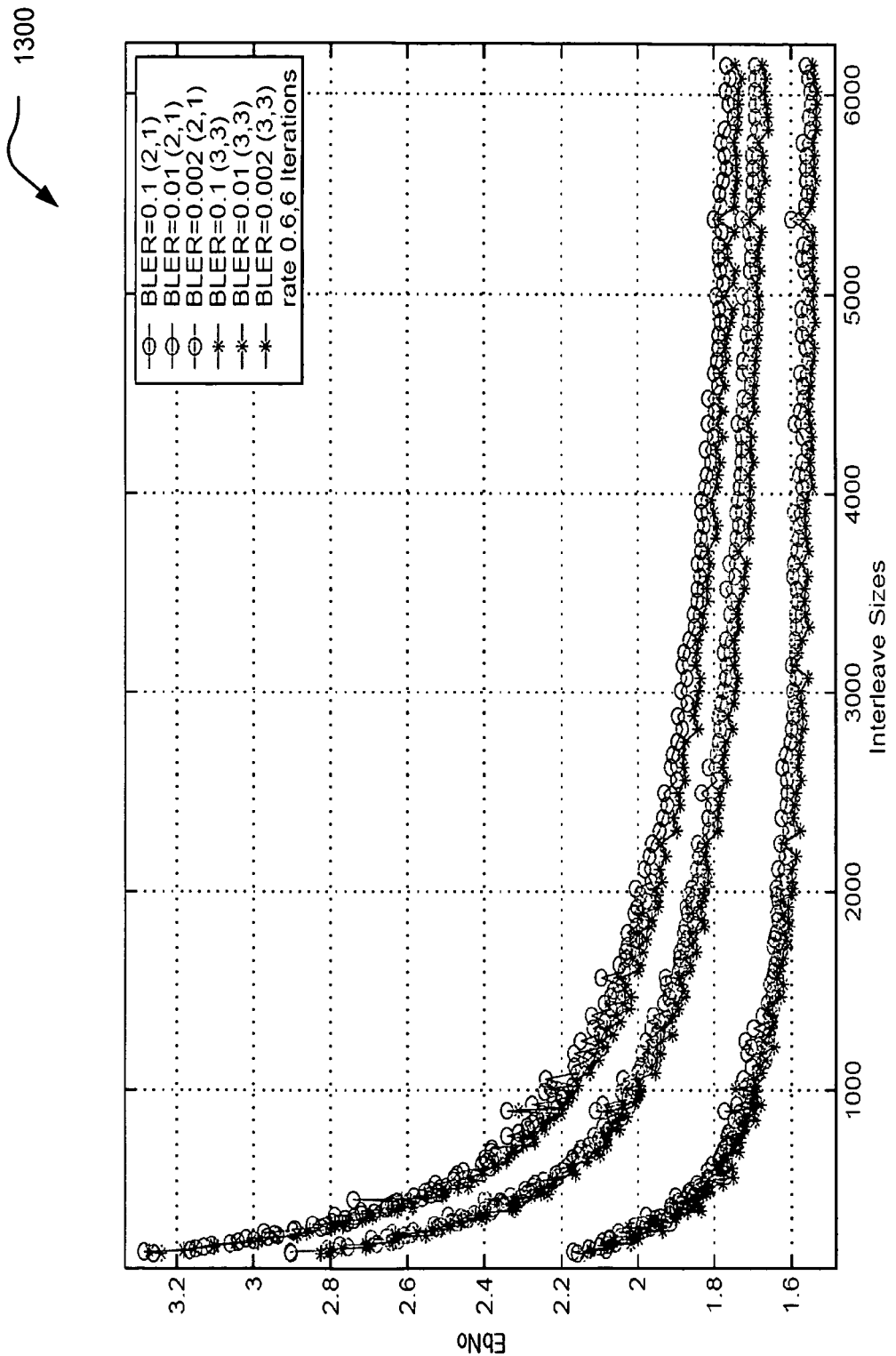

Referring to embodiment 1300 of FIG. 13, clearly, the overall performances of the various codes are also improved when using the new parameters $(\sigma,\delta)=(3,3)$. In detail, among 171 interleave sizes, when BLER=0.1 there are 156 blocks in accordance with the parameters $(\sigma,\delta)=(3,3)$ that are better than when using the parameters $(\sigma,\delta)=(2,1)$, i.e. 91.2% are better; when BLER=0.01 there are 161 blocks (3,3) is better than (2,1), i.e. 94.2% are better; when BLER=0.002 there are 165 blocks (3,3) is better than (2,1), i.e. 96.4% are better.

Figure 14:
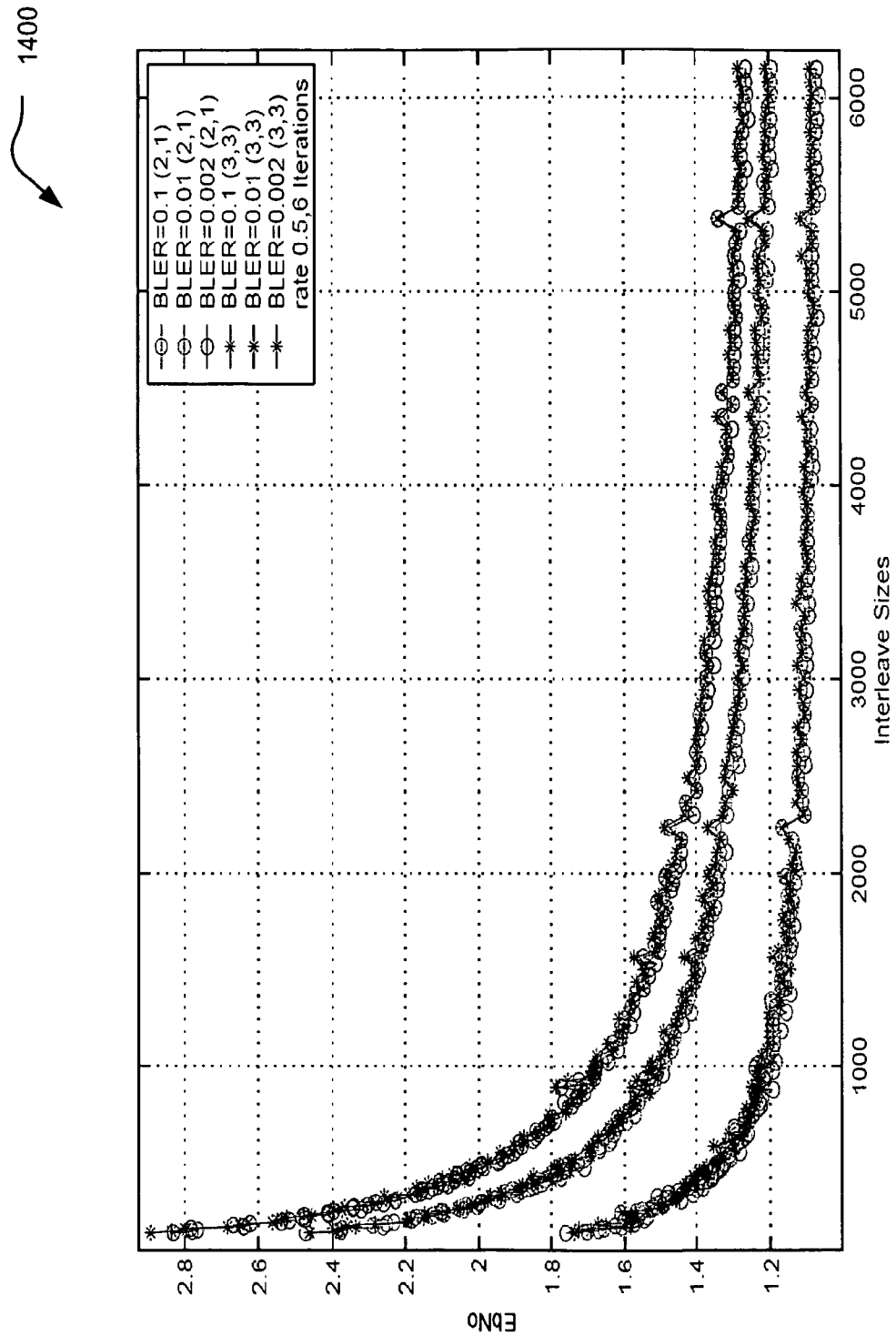
Figure 15:
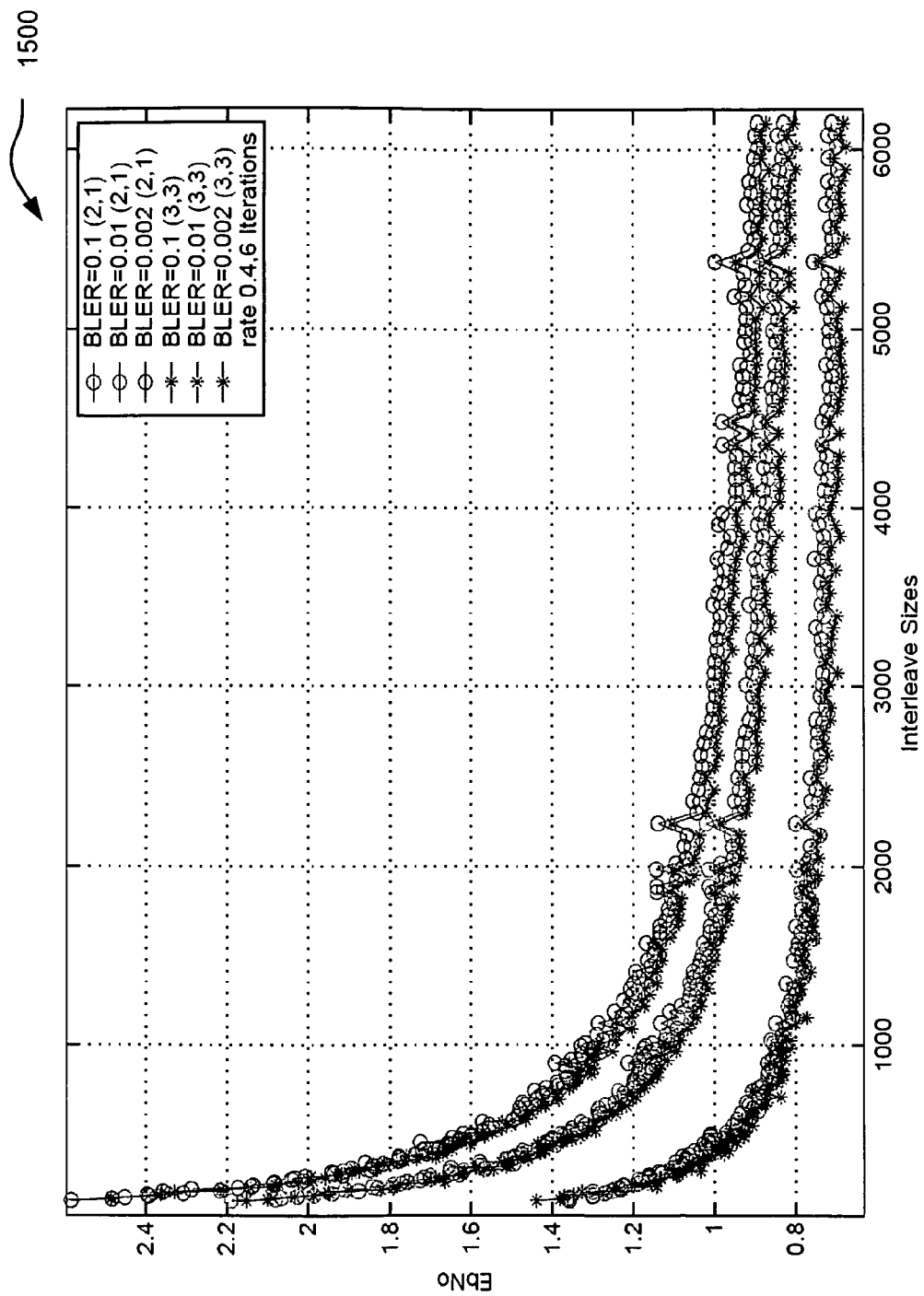

Referring to embodiment 1400 of FIG. 14, with code rate 0.5 and parameters $(\sigma,\delta)=(3,3)$, the overall performances are substantially comparable.

Referring to embodiment 1500 of FIG. 15, again, the overall performances of the various codes are also improved when using the new parameters $(\sigma,\delta)=(3,3)$.

In detail, among 178 interleave sizes, when BLER=0.1 there are 156 blocks in accordance with the parameters $(\sigma,\delta)=(3,3)$ that are better than when using the parameters $(\sigma,\delta)=(2,1)$, i.e. 87.6% are better; when BLER=0.01 there are 167 blocks (3,3) is better than (2,1), i.e. 93.8% are better; when BLER=0.002 there are 172 blocks (3,3) is better than (2,1), i.e. 96.6% are better.

Figure 16:
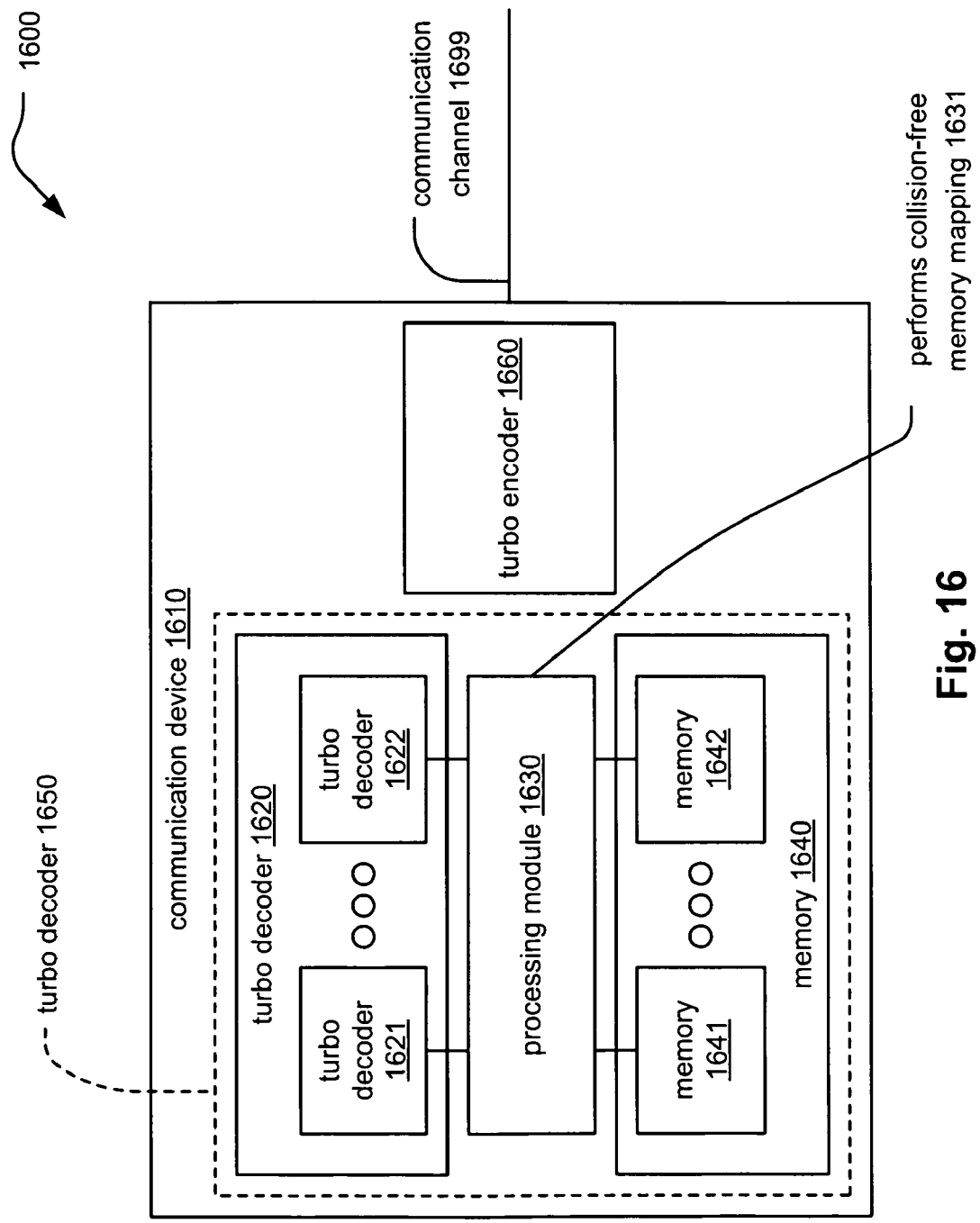
FIG. 16 illustrates another embodiment of a communication system.

FIG. 16 illustrates another embodiment of a communication system 1600. The communication system 1600 includes a communication device 1610 that can be coupled to another device via a communication channel 1699. The communication device 1610 includes a turbo decoder 1620 that is itself composed of a plurality of turbo decoders 1621-1622. The communication device 1610 can also include a turbo encoder 1660 to facilitate bi-directional communication via the communication channel 1699. The communication device 1610 also includes a memory 1640 that is itself composed of a plurality of memories 1641-1642. A processing module 1630 is operable to perform collision-free memory mapping (as shown by reference numeral 1631) between the plurality of turbo decoders 1621-1622 and the plurality of memories 1641-1642 during iterative decoding processing of a turbo coded signal.

As mentioned above, as the throughput requirement in communication systems increases, parallel turbo decoding, which employs a plurality of processors and a plurality of memory banks, become necessary. Many of the current systems support a wide range of codeword sizes. Thus, efficiency and flexibility in parallel turbo decoder design is of critical importance. The various turbo codes employed herein may be decoded using parallel means.

Figure 17:
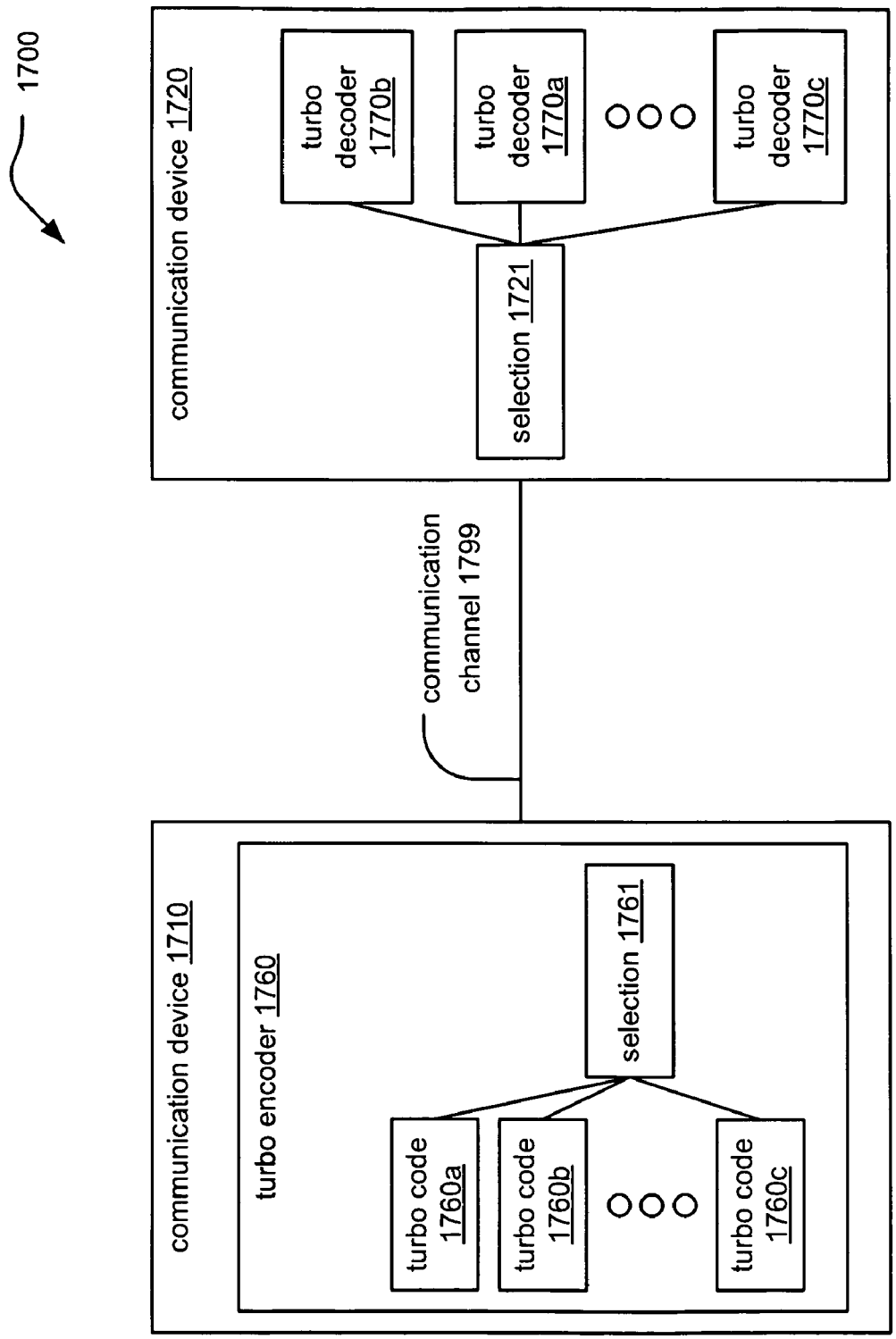
FIG. 17 illustrates another embodiment of a communication system.

FIG. 17 illustrates another embodiment of a communication system 1700. A communication device 1710 includes a turbo encoder 1760 that is operable to perform encoding of information bits according to any one of a number of different turbo codes (e.g., shown as turbo code 1760a, turbo code 1760b, . . . , and turbo code 1760c). A selection 1761 is performed to select which turbo code by which information bits are to be encoded at any particular time.

The selection 1761 can be performed in accordance with any number of means, and a selector can itself be implemented to select which turbo code from among a plurality of possible turbo codes. Alternatively, the selection 1761 can perform processing and modification of a parent turbo code (e.g., a "mother" code) to generate any one of the turbo codes 1760a-1760c.

For example, a mother code (e.g., such as described in more detail within each of the U.S. utility patent application and U.S. utility patent application entitled, "Optimal period rate matching for turbo coding" that are each incorporated by reference above) can be modified to generate multiple other codes. Thereafter, any one code of these multiple other codes can be employed to encode information bits at a given time.

Analogously, any turbo coded signal generated using any one code of these multiple other codes can be processed to generate another coded signal (e.g., processing a $1^{st}$ turbo coded signal to generate a $2^{nd}$ turbo coded signal) that comports with the 'mother code' format. In such a way, a single turbo decoder can be employed to decode any turbo coded signal generated using any one code of these multiple other codes.

Referring again to FIG. 17, a turbo coded signal is then generated using any one of the turbo codes 1760a-1760c within the turbo encoder 1760. after undergoing any subsequent processing (e.g., digital to analog conversion, filtering [analog and/or digital], frequency conversion, symbol mapping, modulation, etc. within the communication device 1710), the turbo coded signal is launched into a communication channel 1799 and transmitted to another communication device 1720.

This embodiment shows that the communication device 1720 include a plurality of turbo decoders (e.g., shown as turbo decoder 1770a, turbo decoder 1770b, . . . , and turbo decoder 1770c). A selection 1721 selects which turbo decoder 1770a-1770c is to be employed for decoding the turbo coded signal received from the communication channel 1799.

For example, in one embodiment, the turbo decoder 1770a is operable to decode turbo coded signal generated using turbo code 1760a. In such a possible embodiment, the turbo decoder 1770b is operable to decode turbo coded signal generated using turbo code 1760b; the turbo decoder 1770c is operable to decode turbo coded signal generated using turbo code 1760c.

Generally speaking, this represents a one to one relationship, in that, each turbo decoder is operable to decode turbo coded signal generated using one of the turbo codes.

However, again, in the case where each of the turbo codes 1760a-1760c is generated from a 'mother' code, then any turbo coded signal generated using one of the turbo codes may undergo processing to comport with the 'mother' code format. It such an instance, a single turbo decoder can be employed to decode all of the turbo coded signals. This does, however, include that any such received turbo coded signal does undergo processing to transform it back to the 'mother' code format.

Figure 18:
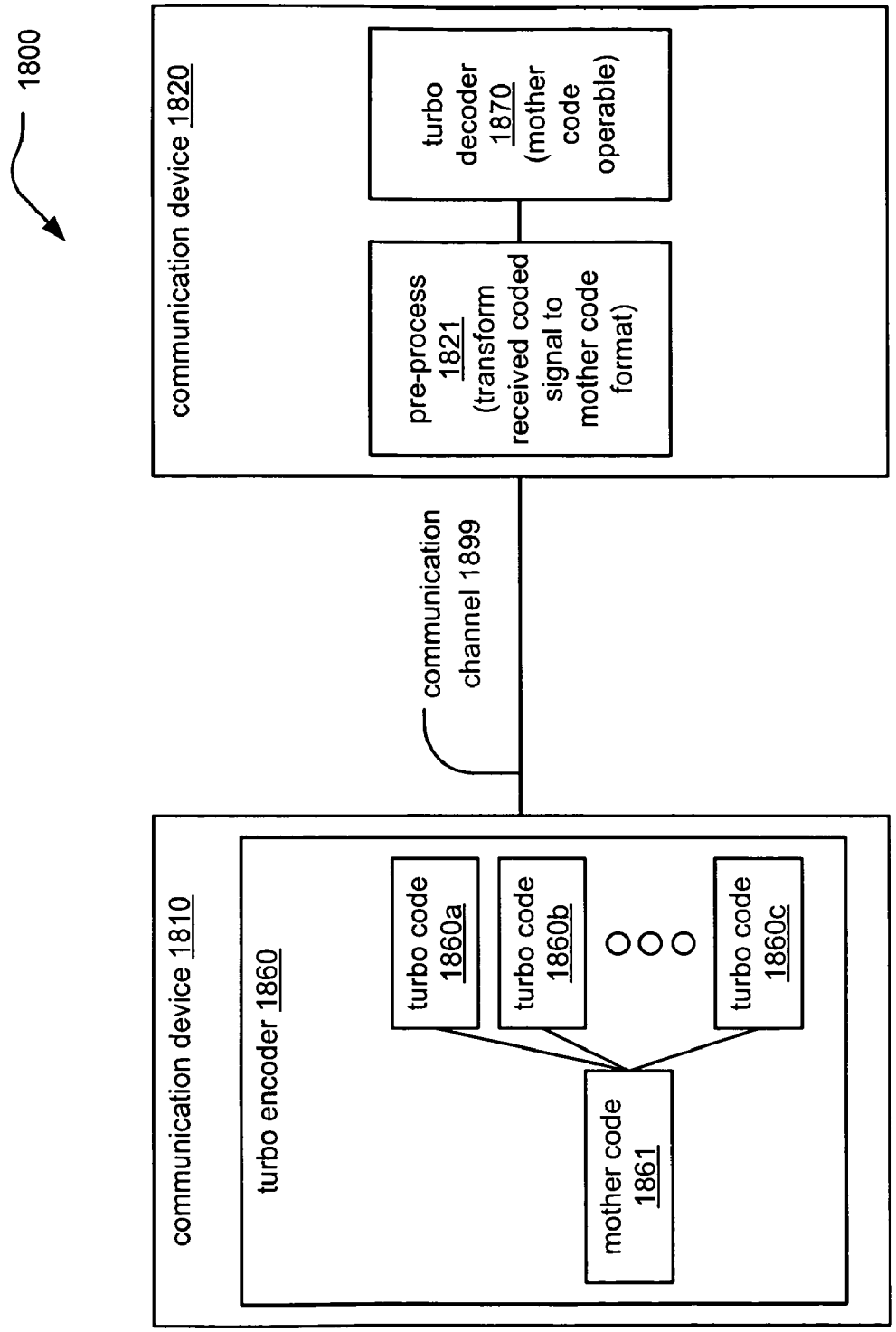
FIG. 18 illustrates another embodiment of a communication system.

FIG. 18 illustrates another embodiment of a communication system 1800. This embodiment shows in more detail how a 'mother' code 1861 may be employed to generate any number of turbo codes (e.g., shown as turbo code 1860a, turbo code 1860b, . . . , and turbo code 1860c) that may each be used by turbo encoder 1860 to encode information bits at a particular time.

For example, the mother code 1861 can be modified to form each of the turbo codes 1860a-1860c. A turbo coded signal is then generated using any one of the turbo codes 1860a-1860c within the turbo encoder 1860. after undergoing any subsequent processing (e.g., digital to analog conversion, filtering [analog and/or digital], frequency conversion, symbol mapping, modulation, etc. within the communication device 1810), the turbo coded signal is launched into a communication channel 1899 and transmitted to another communication device 1820.

In this embodiment, any turbo coded signal generated using one of the turbo codes 1860a-1860c within the turbo encoder 1860 may undergo processing to comport with the 'mother' code format (e.g., in pre-processing module 1821). It such an instance, a single turbo decoder 1870 can be employed to decode all of the turbo coded signals. This does, however, include that any such received turbo coded signal does undergo processing to transform it back to the 'mother' code format.

Figure 19:
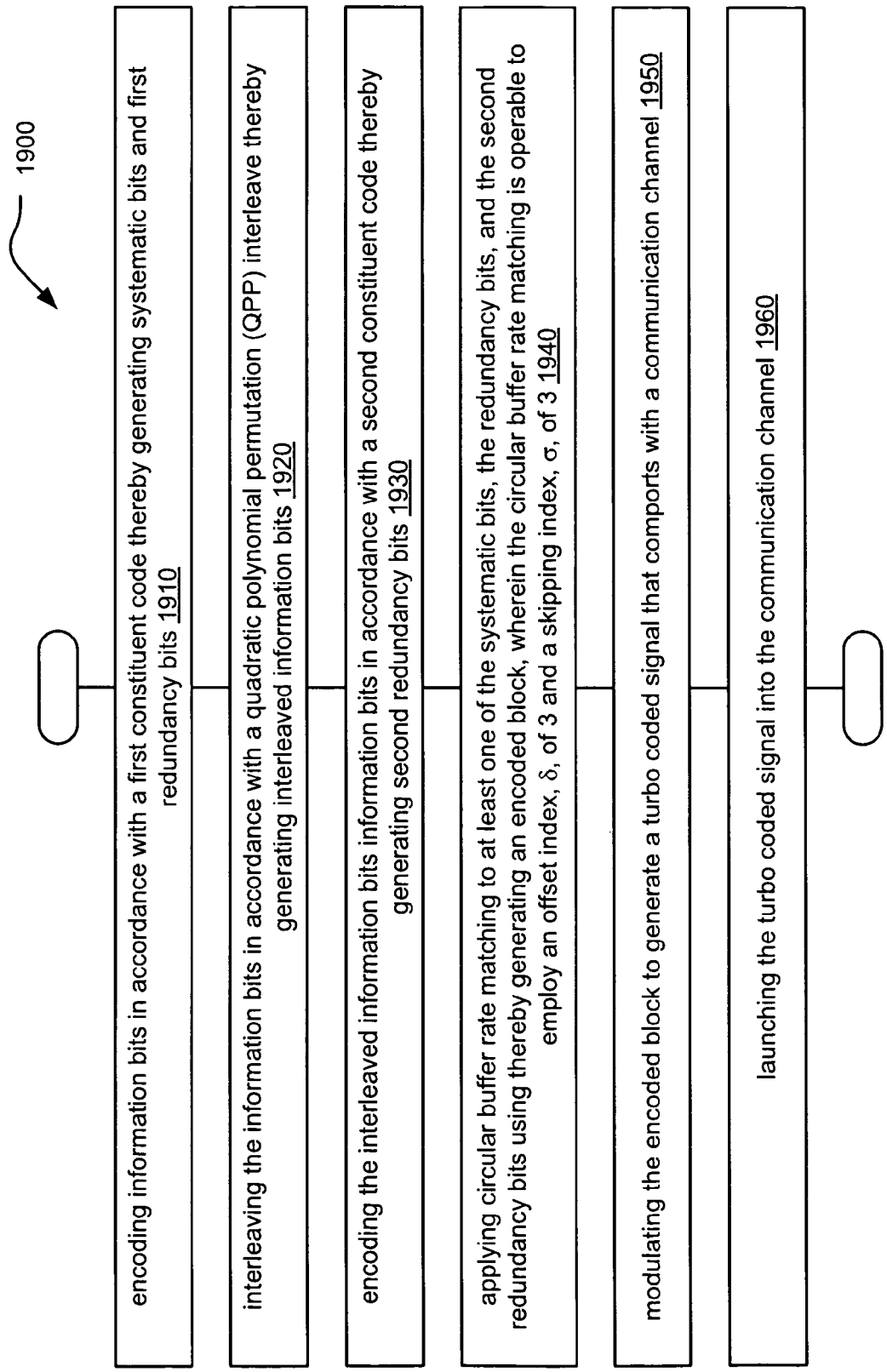
FIG. 19 illustrates an embodiment of a method for processing information bits.

FIG. 19 illustrates an embodiment of a method for processing information bits. The method 1900 begins by encoding information bits in accordance with a first constituent code thereby generating systematic bits and first redundancy bits, as shown in a block 1910.

The method 1900 then continues by interleaving the information bits in accordance with a quadratic polynomial permutation (QPP) interleave thereby generating interleaved information bits, as shown in a block 1920. The method 1900 then continues by encoding the interleaved information bits information bits in accordance with a second constituent code thereby generating second redundancy bits, as shown in a block 1930.

The method 1900 then continues by applying circular buffer rate matching to at least one of the systematic bits, the redundancy bits, and the second redundancy bits using thereby generating an encoded block, as shown in a block 1940. In one embodiment, the circular buffer rate matching is operable to employ an offset index, δ, of 3 and a skipping index, σ, of 3.

The method 1900 then continues by modulating the encoded block to generate a turbo coded signal that comports with a communication channel, as shown in a block 1950. The method 1900 then continues by launching the turbo coded signal into the communication channel, as shown in a block 1960.

In certain embodiments, the method 1900 can be modified also to include receiving the turbo coded signal from the communication channel (e.g., such as may be performed within a communication device). In such an embodiment, the method 1900 could also involve processing the turbo coded signal thereby making an estimate of at least one information bit encoded within the turbo coded signal.

In even another embodiment, the method 1900 could also involve symbol mapping at least one symbol of the encoded block to a constellation having a corresponding mapping of the constellation points therein.

The method 1900 can be performed within a communication device. Such a communication device may be implemented within any number of systems including, though not limited to, a satellite communication system, a wireless communication system, a wired communication system, and/or a fiber-optic communication system.

It is noted that any of the various modules (e.g., encoding modules, decoding modules, processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

REFERENCES

[1] 3GPP TS 36.212 V2.0.0 (2007-09), Technical Specification, "3rd Generation Partnership Project; Technical Specification Group Radio Access Network; Evolved Universal Terrestrial Radio Access (E-UTRA); Multiplexing and channel coding (Release 8)", (30 pages).

[2] Ericsson, "Decoder Performance of CBRM Algorithms," 3GPP TSG-RAN WG1#49bis, Orlando, USA, Jun. 25-29, 2007, R1-073163, (5 pages).

What is claimed is:

1. A communication device, comprising:
a processing module; and
a memory, coupled to the processing module, that is operable to store operational instructions that enable the processing module to:
encode information bits in accordance with a first constituent code thereby generating systematic bits and first redundancy bits;
interleave the information bits in accordance with a quadratic polynomial permutation (QPP) interleave thereby generating interleaved information bits;
encode the interleaved information bits information bits in accordance with a second constituent code thereby generating second redundancy bits; and
apply circular buffer rate matching to at least one of the systematic bits, the redundancy bits, and the second redundancy bits using thereby generating an encoded block; and wherein:
the encoded block undergoes modulation to generate a turbo coded signal that comports with a communication channel;
the turbo coded signal is launched into the communication channel; and
the circular buffer rate matching is operable to employ an offset index, $\delta$, of 3 and a skipping index, $\sigma$, of 3.

2. The communication device of claim 1, wherein:
the communication device is a first communication device;
the first communication device is a coupled to a second communication device via the communication channel;
the second communication device is operable to receive the turbo coded signal from the communication channel; and
the second communication device is operable to process the turbo coded signal thereby making an estimate of at least one information bit encoded within the turbo coded signal.

3. The communication device of claim 1, wherein:
the communication device is a first communication device;
the turbo coded signal is a first turbo coded signal;
the information bits are first information bits;
the first communication device is operable to process the first information bits thereby generating the first turbo coded signal;
the first communication device is operable to process second information bits thereby generating a second turbo coded signal and the second turbo coded signal is launched into the communication channel;
the first communication device is a coupled to a second communication device via the communication channel;
the second communication device is operable to receive the first turbo coded signal from the communication channel;
the second communication device is operable to receive the second turbo coded signal from the communication channel;
the second communication device is operable to process the first turbo coded signal thereby making the estimate of the at least one information bit encoded within the first turbo coded signal; and
the second communication device is operable to process the second turbo coded signal thereby making at least one additional estimate of at least one information bit encoded within the second turbo coded signal.

4. The communication device of claim 1, wherein:
the communication device is a first communication device;
the first communication device is a coupled to a second communication device via the communication channel;
the second communication device is operable to receive the turbo coded signal from the communication channel; and
the second communication device includes a plurality of turbo decoders implemented to perform parallel decoding processing of the turbo coded signal.

5. The communication device of claim 1, wherein:
the communication device is a first communication device;
the first communication device is a coupled to a second communication device via the communication channel;
the second communication device includes a selector and a plurality of turbo decoders;
based on a turbo code by which the turbo coded signal has been generated within the first communication device, the selector is operable to provide the turbo coded signal to one turbo decoder of the plurality of turbo decoders; and
the selected one turbo decoder is operable to process the turbo coded signal thereby making an estimate of at least one information bit encoded within the turbo coded signal.

6. The communication device of claim 1, wherein:
the modulation of the encoded block includes symbol mapping at least one symbol of the encoded block to a constellation having a corresponding mapping of the constellation points therein.

7. The communication device of claim 1, wherein:
the constellation is a QPSK constellation.

8. The communication device of claim 1, wherein:
the communication device is a wireless communication device.

9. The communication device of claim 1, wherein:
the communication device is implemented within at least one of a satellite communication system, a wireless communication system, a wired communication system, and a fiber-optic communication system.

10. A communication device, comprising:

a first constituent encoder that is operable to encode information bits in accordance with a first constituent code thereby generating systematic bits and first redundancy bits;

an interleaver that is operable to interleave the information bits in accordance with a quadratic polynomial permutation (QPP) interleave thereby generating interleaved information bits;

a second constituent encoder that is operable to encode the interleaved information bits information bits in accordance with a second constituent code thereby generating second redundancy bits; and a rate matching module that is operable to apply circular buffer rate matching to at least one of the systematic bits, the redundancy bits, and the second redundancy bits using thereby generating an encoded block; and wherein:

the encoded block undergoes modulation to generate a turbo coded signal that comports with a communication channel;

the turbo coded signal is launched into the communication channel; and the circular buffer rate matching is operable to employ an offset index, $\delta$, of 3 and a skipping index, $\sigma$, of 3.

11. The communication device of claim 10, wherein:

the communication device is a first communication device;

the first communication device is a coupled to a second communication device via the communication channel;

the second communication device is operable to receive the turbo coded signal from the communication channel; and the second communication device is operable to process the turbo coded signal thereby making an estimate of at least one information bit encoded within the turbo coded signal.

12. The communication device of claim 10, wherein:

the communication device is a first communication device;

the turbo coded signal is a first turbo coded signal;

the information bits are first information bits;

the first communication device is operable to process the first information bits thereby generating the first turbo coded signal;

the first communication device is operable to process second information bits thereby generating a second turbo coded signal and the second turbo coded signal is launched into the communication channel;

the first communication device is a coupled to a second communication device via the communication channel;

the second communication device is operable to receive the first turbo coded signal from the communication channel;

the second communication device is operable to receive the second turbo coded signal from the communication channel;

the second communication device is operable to process the first turbo coded signal thereby making the estimate of the at least one information bit encoded within the first turbo coded signal; and the second communication device is operable to process the second turbo coded signal thereby making at least one additional estimate of at least one information bit encoded within the second turbo coded signal.

13. The communication device of claim 10, wherein:

the communication device is a first communication device;

the first communication device is a coupled to a second communication device via the communication channel;

the second communication device is operable to receive the turbo coded signal from the communication channel; and the second communication device includes a plurality of turbo decoders implemented to perform parallel decoding processing of the turbo coded signal.

14. The communication device of claim 10, wherein:

the modulation of the encoded block includes symbol mapping at least one symbol of the encoded block to a constellation having a corresponding mapping of the constellation points therein.

15. The communication device of claim 10, wherein:

the communication device is a wireless communication device.

16. The communication device of claim 10, wherein:

the communication device is implemented within at least one of a satellite communication system, a wireless communication system, a wired communication system, and a fiber-optic communication system.

17. A method, comprising:

encoding information bits in accordance with a first constituent code thereby generating systematic bits and first redundancy bits;

interleaving the information bits in accordance with a quadratic polynomial permutation (QPP) interleave thereby generating interleaved information bits;

encoding the interleaved information bits information bits in accordance with a second constituent code thereby generating second redundancy bits;

applying circular buffer rate matching to at least one of the systematic bits, the redundancy bits, and the second redundancy bits using thereby generating an encoded block, wherein the circular buffer rate matching is operable to employ an offset index, $\delta$, of 3 and a skipping index, $\sigma$, of 3;

modulating the encoded block to generate a turbo coded signal that comports with a communication channel; and launching the turbo coded signal into the communication channel.

18. The method of claim 17, further comprising:

receiving the turbo coded signal from the communication channel; and processing the turbo coded signal thereby making an estimate of at least one information bit encoded within the turbo coded signal.

19. The method of claim 17, further comprising:

symbol mapping at least one symbol of the encoded block to a constellation having a corresponding mapping of the constellation points therein.

20. The method of claim 17, wherein:

the method is performed within a communication device; and the communication device is implemented within at least one of a satellite communication system, a wireless communication system, a wired communication system, and a fiber-optic communication system.

\* \* \* \* \*

UNITED STATES PATENT AND TRADEMARK OFFICE
CERTIFICATE OF CORRECTION

PATENT NO. : 8,069,400 B2
APPLICATION NO. : 12/132971
DATED : November 29, 2011
INVENTOR(S) : Ba-Zhong Shen et al.

It is certified that error appears in the above-identified patent and that said Letters Patent is hereby corrected as shown below:

In the Claims:

Col. 15, line 44, in claim 1: delete "using" before "thereby"
Col. 16, line 8, in claim 3: replace "device is a coupled" with --device is coupled--
Col. 16, line 27, in claim 4: replace "device is a coupled" with --device is coupled--
Col. 17, line 11, in claim 10: after "information bits" delete "information bits"
Col. 17, line 18, in claim 10: delete "using" before "thereby"
Col. 17, line 29, in claim 11: replace "device is a coupled" with --device is coupled--
Col. 18, line 32, in claim 17: after "interleaved information bits" delete "information bits"
Col. 18, line 37, in claim 17: delete "using" before "thereby"

Signed and Sealed this
Thirtieth Day of April, 2013

Teresa Stanek Rea
*Acting Director of the United States Patent and Trademark Office*